United States Patent
Wang

(10) Patent No.: US 8,194,752 B2
(45) Date of Patent: Jun. 5, 2012

(54) METHOD FOR MAPPING MEMORY ADDRESSES, MEMORY ACCESSING APPARATUS AND METHOD THEREOF

(75) Inventor: Tsun-Hsien Wang, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 1501 days.

(21) Appl. No.: 11/625,827

(22) Filed: Jan. 23, 2007

(65) Prior Publication Data

US 2008/0089426 A1    Apr. 17, 2008

(30) Foreign Application Priority Data

Oct. 12, 2006  (TW) ................................ 95137501 A

(51) Int. Cl.
*H04N 9/877* (2006.01)
(52) U.S. Cl. ................ 375/240.25; 348/14.13; 348/247; 348/638; 348/712; 348/716
(58) Field of Classification Search .................... 375/240
See application file for complete search history.

(56) References Cited

U.S. PATENT DOCUMENTS

| | | | |
|---|---|---|---|
| 5,335,117 A * | 8/1994 | Park et al. ....................... 360/48 |
| 5,386,132 A * | 1/1995 | Wong ............................ 257/316 |
| 5,444,483 A * | 8/1995 | Maeda ....................... 348/231.6 |
| 5,623,311 A | 4/1997 | Phillips et al. | |
| 5,668,599 A | 9/1997 | Cheney et al. | |
| 5,874,995 A * | 2/1999 | Naimpally et al. ...... 375/240.25 |
| 5,910,824 A | 6/1999 | Yu | |
| 5,920,352 A * | 7/1999 | Inoue .......................... 348/384.1 |
| 6,396,955 B1 * | 5/2002 | Abe ............................ 382/232 |
| 6,751,257 B1 | 6/2004 | Chen et al. | |
| 7,068,847 B1 * | 6/2006 | Chen ........................... 382/233 |
| 2003/0123555 A1 | 7/2003 | Kim | |
| 2004/0061704 A1 | 4/2004 | Ju et al. | |

OTHER PUBLICATIONS

Tanskanen et al., Scalable Parallel Memory Architectures for Video Coding, Sep. 1, 2004, Springer Netherlands, The Journal of VLSI Signal Processing vol. 38 Issue 2, pp. 173-199.*

* cited by examiner

*Primary Examiner* — Taghi Arani
*Assistant Examiner* — Kenneth Chang
(74) *Attorney, Agent, or Firm* — Jianq Chyun IP Office

(57) ABSTRACT

A memory accessing apparatus and a method thereof are provided, which are suitable for methods and apparatuses that access memory data in blocks, such as a video decoder. An advanced memory mapping method is adopted to generate the column address and row address of a data word in a memory based on the logic address of the data word in a video frame. Macroblocks are organized into clusters, macroblocks of the same cluster are stored in the same row of the memory, and the orders in which the video decoder reads and writes macroblocks are rearranged so as to reduce the number of row changes in memory access and improve the throughput of memory access. Furthermore, memory accesses between the video decoder and the display controller can be coordinated.

22 Claims, 26 Drawing Sheets

METHOD FOR MAPPING MEMORY ADDRESSES, MEMORY ACCESSING APPARATUS AND METHOD THEREOF

CROSS-REFERENCE TO RELATED APPLICATION

This application claims the priority benefit of Taiwan application serial no. 95137501, filed on Oct. 12, 2006. All disclosure of the Taiwan application is incorporated herein by reference.

BACKGROUND OF THE INVENTION

1. Field of the Invention

The present invention relates to memory address mapping and memory access. More particularly, the present invention relates to memory address mapping and memory access in blocks.

2. Description of Related Art

FIG. 1 illustrates a typical video decoding and display system 100. The video decoder 101 receives a data signal compressed by a video encoder and rebuilds a video frame according to the data signal. The video decoder 101 then writes the rebuilt video frame into a synchronous dynamic random access memory (SDRAM) 105 through a SDRAM controller 104. The video decoder 101 also reads the data of a reference frame from the SDRAM 105 for rebuilding the video frame. Meanwhile, a display controller 102 reads reconstructed frames from the SDRAM 105 to be displayed by a display 103. Since the video decoder 101 and the display controller 102 cannot access the SDRAM 105 at the same time, the accesses to the memory of the two should be coordinated appropriately.

The SDRAM 105 is accessed in words, and a word may be composed of 4, 8, or 16 bits. FIG. 2 is a schematic block diagram of the SDRAM 105. As shown in FIG. 2, the SDRAM 105 includes four banks, namely, banks 0~3. Each bank includes 4K rows, and each row includes 1K words. Accordingly, a column address, a row address, and a bank address have to be appointed to access each word in the SDRAM 105.

A SDRAM requires several clock cycles for each row change so that the current row is turned off first and then the next row is turned on. Thus, row changes may reduce the bus efficiency of the SDRAM, namely, the access efficiency of the SDRAM.

The video decoder 101 decodes in macroblocks of 16×16 pixels. With general storage method, each macroblock stored in a SDRAM spans over a plurality of rows. When the video decoder 101 is rebuilding a macroblock, it may not read only one block corresponding to the reference frame; instead, it may read the data of other macroblocks adjacent to this block. Accordingly, there must be a lot of row changes at video decoding, and the number of row changes has to be reduced to improve decoding efficiency.

Besides the foregoing problem of row change, the efficiency of video encoding is also affected by address mapping conversion. The video decoder has to convert the logic address of each word in the video frame into the column address and row address of SDRAM. Complex calculations, such as table look-up and/or continuous additions and multiplications, are used in conventional techniques such as U.S. Pat. Nos. 5,668,599 and 5,910,824, which are still to be improved.

SUMMARY OF THE INVENTION

Accordingly, the present invention is directed to provide a memory accessing apparatus for improving the bus efficiency of random access memory (RAM).

The present invention further provides a memory accessing method for improving the access efficiency of RAM.

The present invention further provides a method for mapping memory addresses so as to provide an easy and efficient memory address mapping mechanism.

The present invention provides a memory accessing apparatus including a read buffer, a write buffer, a first address generator, and a calculation unit. The read buffer reads a plurality of first datasets from at least one memory according to a plurality of read addresses provided by the first address generator, and provides the first datasets to the calculation unit. The calculation unit receives a data signal and determines whether the first datasets are required according to the data signal. If the first datasets are required, the calculation unit generates a plurality of second datasets according to the data signal and the first datasets, otherwise the calculation unit generates the second datasets according to the data signal. The write buffer receives the second datasets from the calculation unit and writes the second datasets into the memory according to a plurality of write addresses provided by the first address generator.

In the memory accessing apparatus, each of the first datasets includes various types of first data blocks, the read buffer reads the first datasets from the memory in the order of the types of the first data blocks, and the read buffer provides the first datasets to the calculation unit in the order of the datasets containing the first data blocks. Similarly, each of the second datasets includes various types of second data blocks, the write buffer receives the second datasets from the calculation unit in the order of the datasets containing the second data blocks, and the write buffer write the second datasets into the memory in the order of the types of the second data blocks.

In the memory accessing apparatus, each of the data blocks, namely, each of the first data blocks and the second data blocks, belongs to a data array. The data array belongs to a data array group, and each of a plurality of data arrays in the data array group is composed of the same type of data clusters. Each of the data arrays includes a plurality of data clusters, each of the data clusters includes a plurality of data blocks, and each of the data clusters is stored in the same row of the memory. The read address and write address of each of the data blocks are determined according to the position of the data block in the data cluster and the position of the data cluster in the data array.

The present invention further provides a memory accessing method. The method includes following steps. A data signal is received and a predetermined calculation is executed according to the data signal to generate a plurality of second datasets. The second datasets are written into at least one memory. Wherein each of the second datasets includes various types of second data blocks. The second data blocks are generated by the predetermined calculation in the order of the datasets containing the second data blocks, and the second data blocks are written into the memory in the order of the types of the second data blocks.

The present invention further provides a method for mapping memory addresses which includes following steps. If the width of a data array is less than $2^p$ bytes, the width of the data array will be deemed as $2^p$ bytes, wherein p is the least integer which allows $2^p$ to be greater than or equal to the width of the data array. Divide the data array into a plurality of data clusters and each of the data clusters is then divided into a plurality of words. The length of each word is $2^n$ bits, the width of each data cluster is $2^a$ words, the height of each data cluster is $2^b$ rows, and the width of the data array is considered as $2^c$ data clusters, wherein a, b, c, and n are all predetermined positive integers. Finally, the column address and row address of each word are determined according to the position of the word in the data cluster and the position of the data cluster in the data array, wherein all the words contained in each of the data cluster have the same row address.

In order to make the aforementioned and other features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The method for mapping memory addresses, a memory accessing apparatus, and a method thereof in the present invention will be described with an embodiment. Application of the present invention in video decoding will be described for the convenience of understanding.

Figure 1:
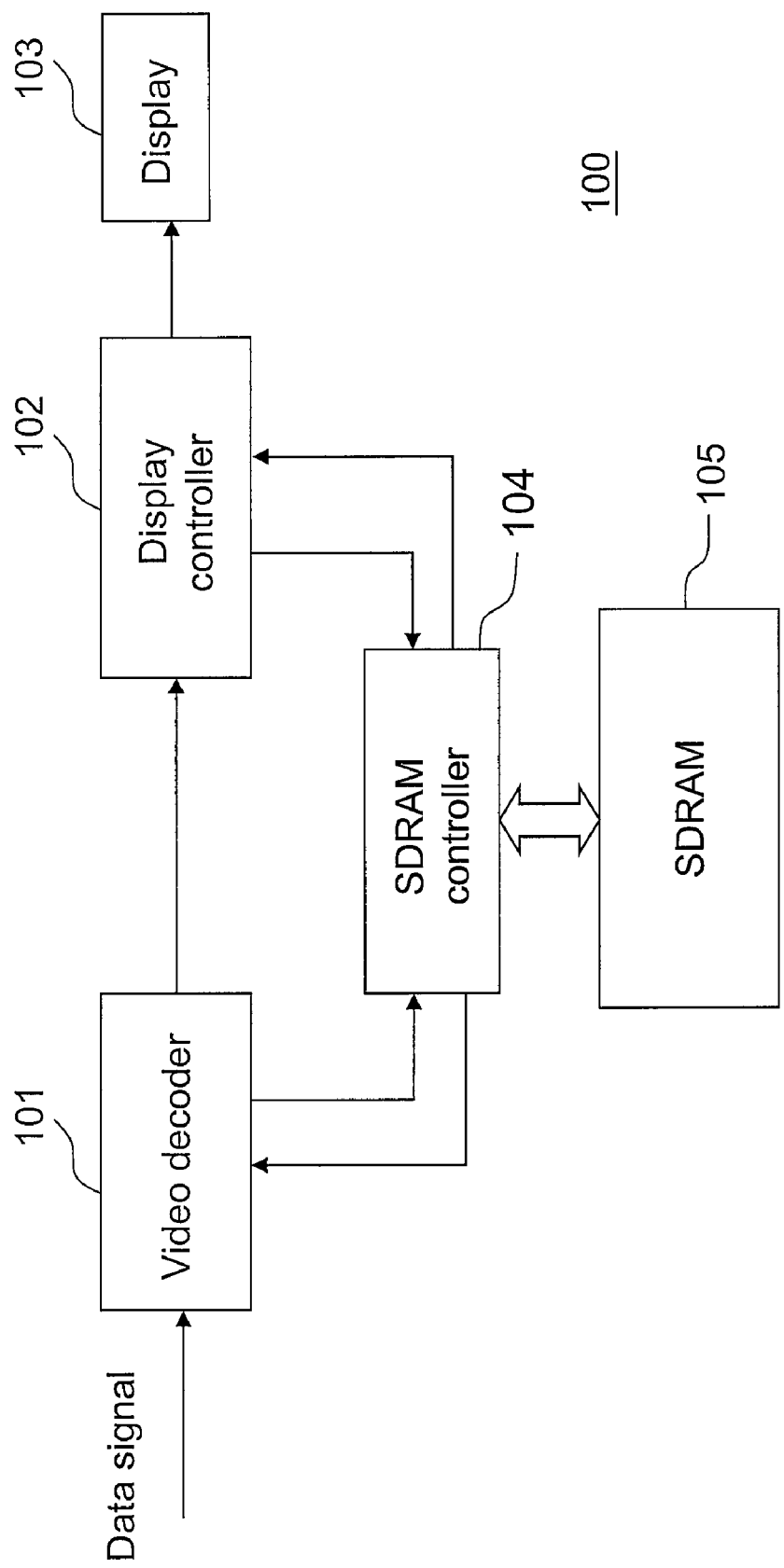
FIG. 1 is a schematic block diagram of a conventional video decoding and display system.
Figure 2:
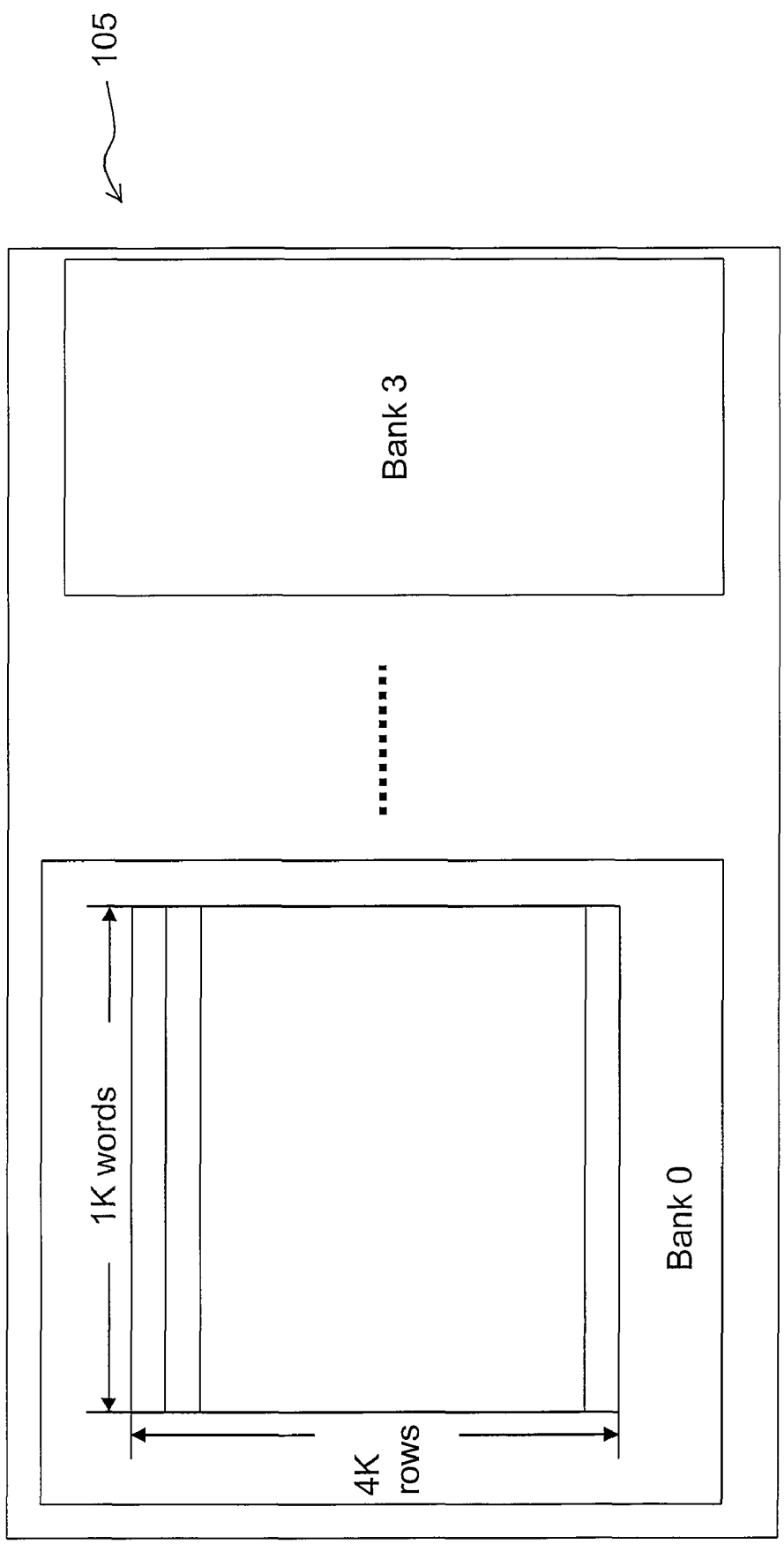
FIG. 2 illustrates a typical SDRAM storage space.
Figure 3:
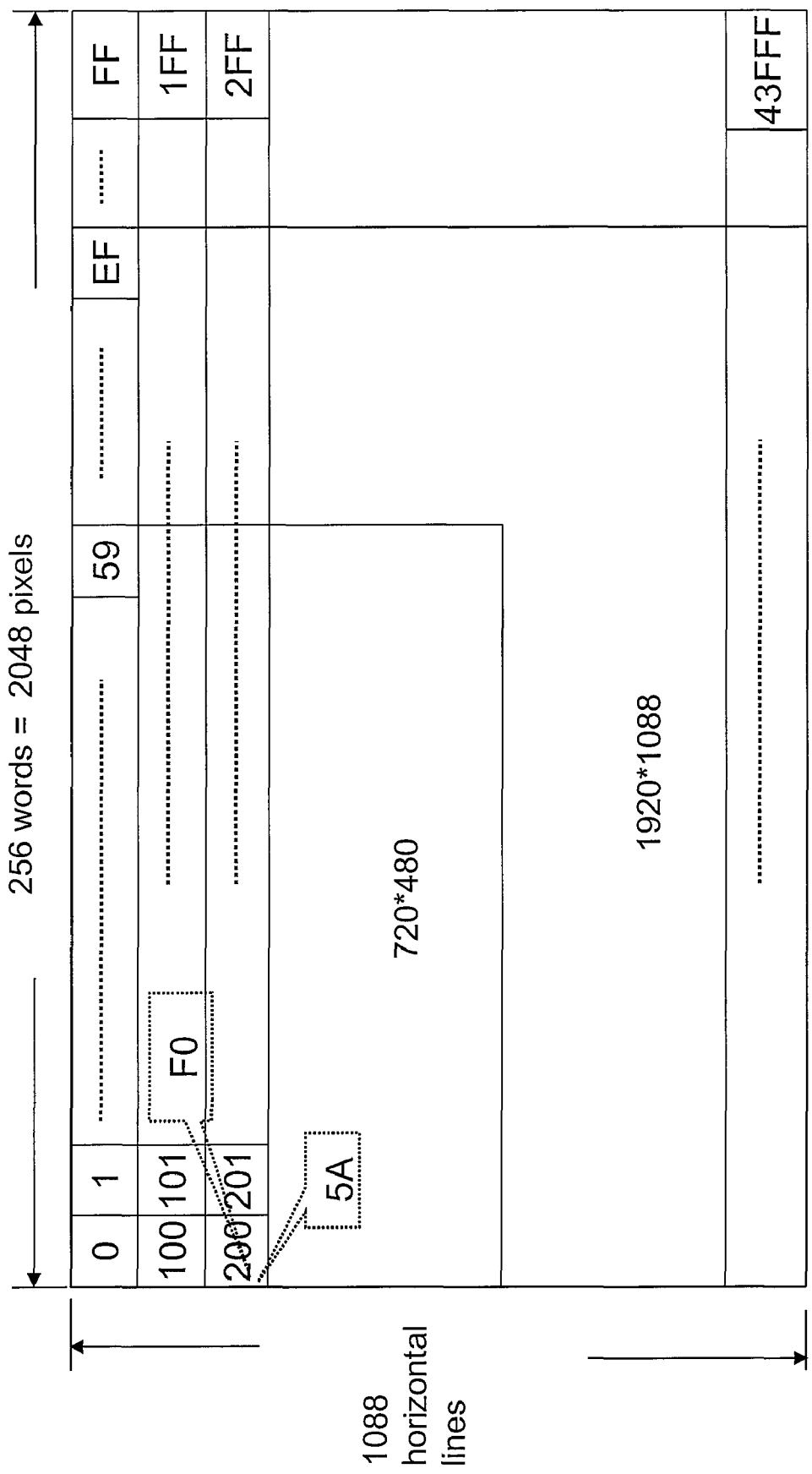
FIG. 3 illustrates the relationship between the size of a video frame and the logic addresses of words.

The method for mapping memory addresses in the present invention will be described first. FIG. 3 illustrates the logic address of a video frame in the present embodiment. In the present embodiment, the memory is accessed in words, and each word includes 8 pixels. Each word has a logic address in a video frame according to its position in the video frame. Conventionally logic addresses are arranged continuously from top to bottom, from left to right. The logic address of the top left word is 0. In a video frame of 720×480, the logic address of the last word in the first horizontal line is 59, and the logic address of the first word in the second horizontal line is 5A (in hex). In a video frame of 1920×1088, the logic address of the last word in the first horizontal line is EF, and the logic address of the first word in the second horizontal line is F0. In a video frame of 2048×1088, the logic address of the last word in the first horizontal line is FF, and the logic address of the first word in the second horizontal line is 100.

As shown in FIG. 3, conventionally, a word at the same position in video frames of different sizes has different logic addresses. For example, in FIG. 3, the first word of the second horizontal line has logic addresses 5A, F0, and 100 respectively in video frames of three different sizes. A video frame is stored in a memory, and every time when a word is accessed, the logic address of the word has to be mapped to the address thereof in the memory. Conventionally, the logic address varies along with the size of the frame, and which may complicate the corresponding procedure and reduce address mapping efficiency. To resolve this problem, in the present embodiment, regardless of the size of the original video frame, the width of a video frame is always considered as $2^p$ pixels as long as the width of the video frame is less than $2^p$ pixels, wherein p is the least integer which allows $2^p$ to be greater than or equal to the width of the video frame, for example, the width of 720 pixels is considered as 1024 pixels and the width of 1920 pixels is considered as 2048 pixels.

In the present embodiment, only the width of a frame is enlarged when necessary while the frame image does not have to be enlarged, namely, steps such as image scaling or data filling is not compulsory as long as the width of the frame is considered as greater than or equal to $2^n$ of the original width of the frame, wherein n is an integer.

In the present embodiment, video encoding is performed with YCbCr color model, wherein Y represents luminance, Cb and Cr represent chrominance. The Y, Cb, and Cr pixel components of each pixel respectively take up a byte, namely, 8 bits. The Y components of each video frame form an independent data array, the Cb and Cr components form another independent data array, and the two data arrays are stored at different positions of the memory.

Figure 4:
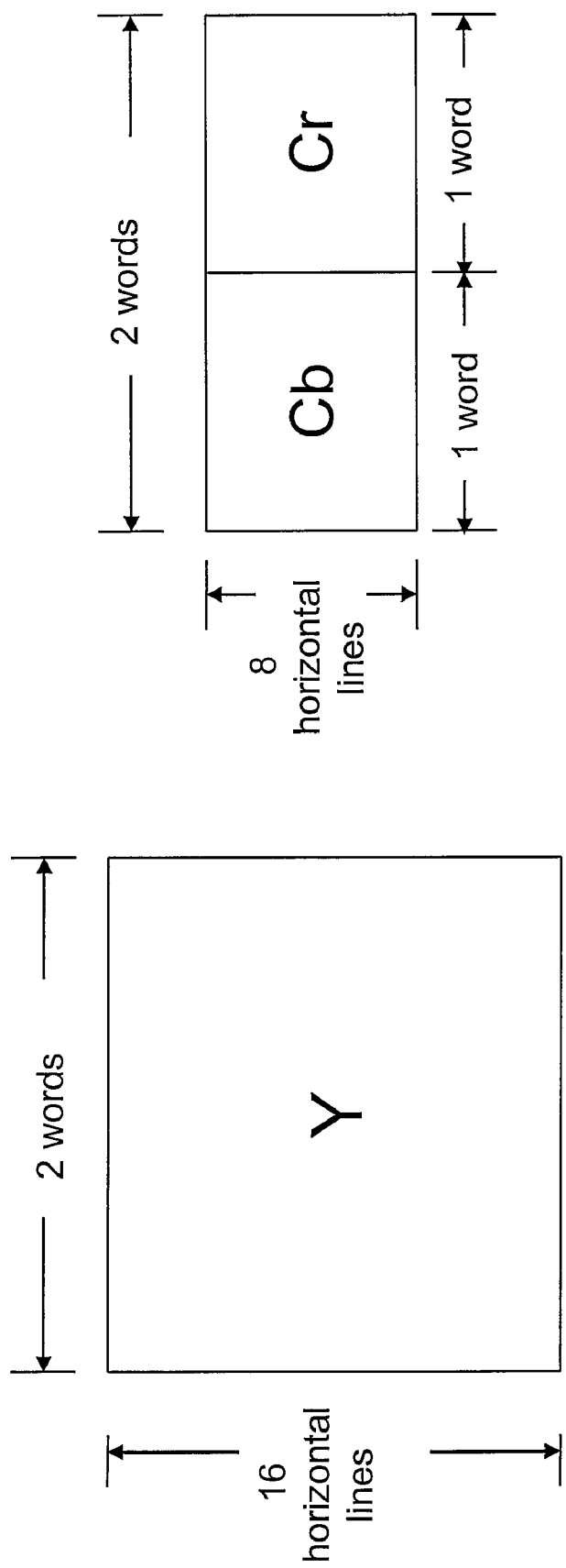
FIG. 4 illustrates a macroblock of a typical video frame.

Video decoding is performed in macroblocks. FIG. 4 illustrates macroblocks of YCbCr. The size of Y macroblock is 16×16 pixels, thus, the width of Y macroblock is 2 words. The sizes of Cb and Cr macroblocks are respectively 8×8 pixels. However, a Cb macroblock and a Cr macroblock are combined to be processed in video decoding, thus, a Cb macroblock and a Cr macroblock are considered as a macroblock of 16×8 pixels.

Figure 5:
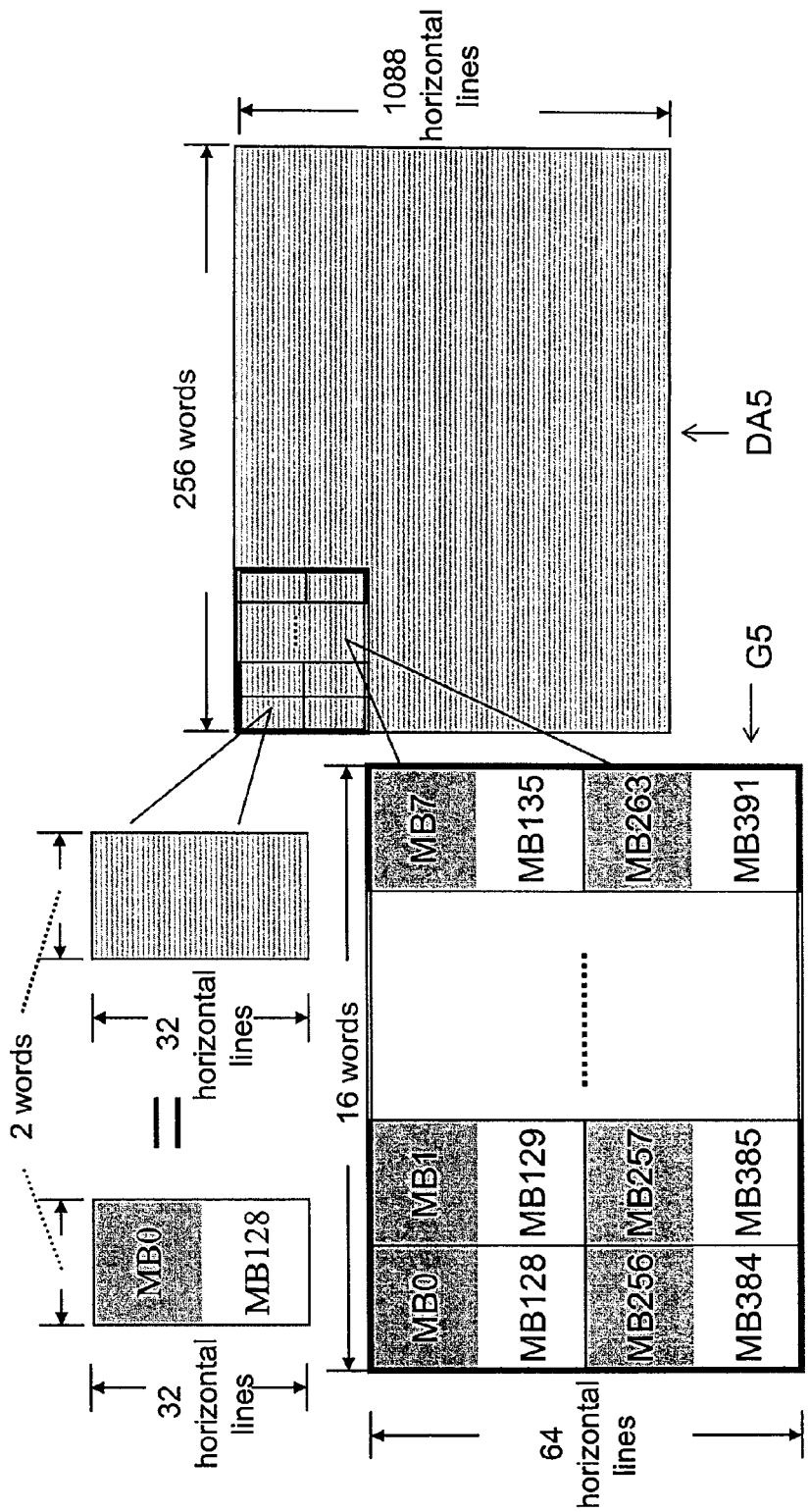
FIGS. 5~6 illustrate a data cluster according to an embodiment of the present invention.
Figure 6:
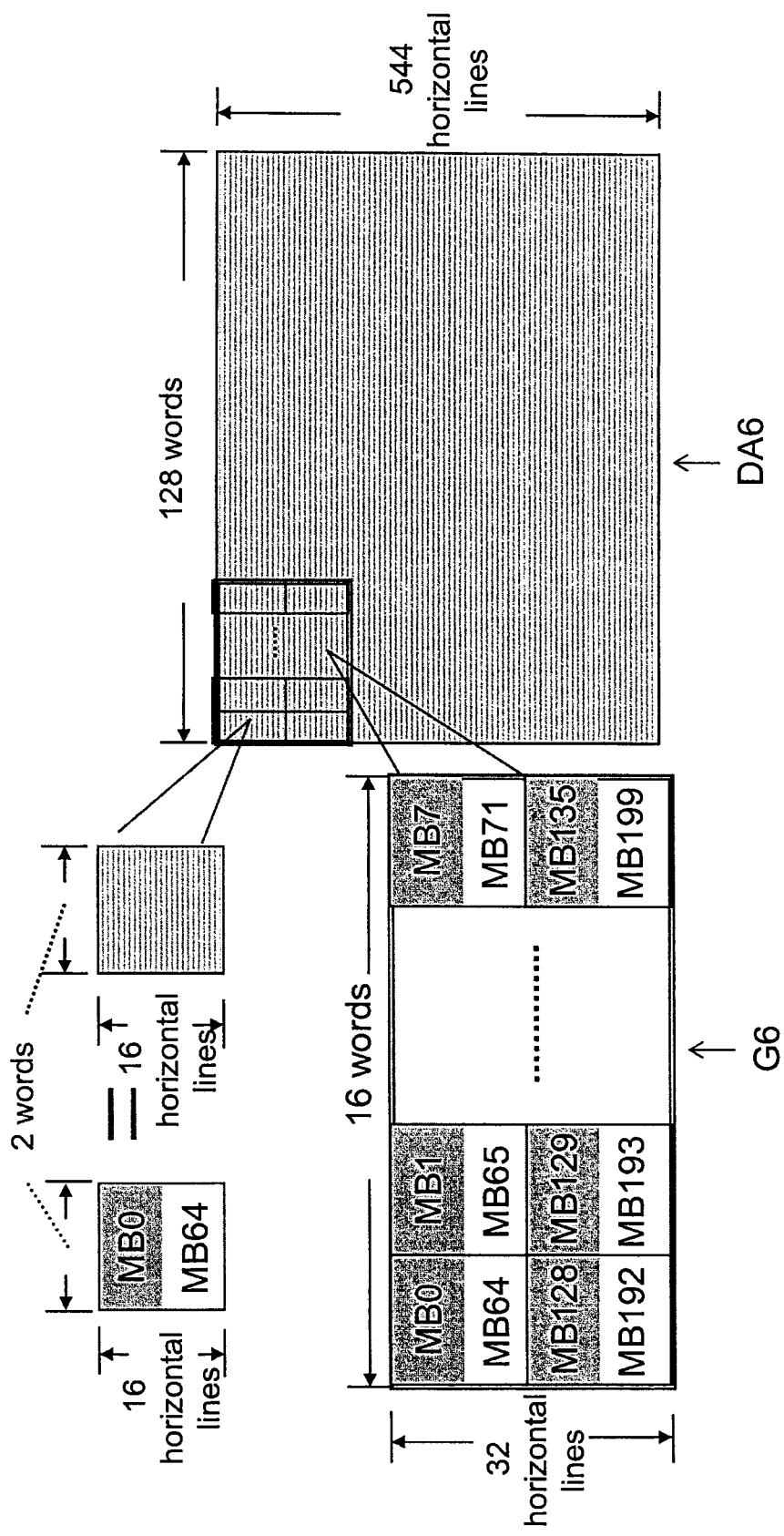

According to one feature of the present invention, adjacent macroblocks are integrated into a data cluster and the data of the same data cluster is stored in the same row of the memory, thus, row change of the memory is not necessary when macroblocks of the same cluster are read during video decoding. The data cluster of Y macroblocks is as shown in FIG. 5, wherein each data cluster G5 is composed of 8×4 Y macroblocks, and the Y data array DA5 of the video frame is composed of data clusters G5 of the same size. Each data cluster G5 contains 1K words, and in the present embodiment, each row of the memory also contains 1K words, so that each row of the memory exactly accommodates the data clusters of a Y component. The data clusters of CbCr macroblocks are as shown in FIG. 6, each data cluster G6 is composed of 8×4

CbCr macroblocks and the CbCr data array DA6 of the video frame is composed of data clusters G6 of the same size.

Figure 7:
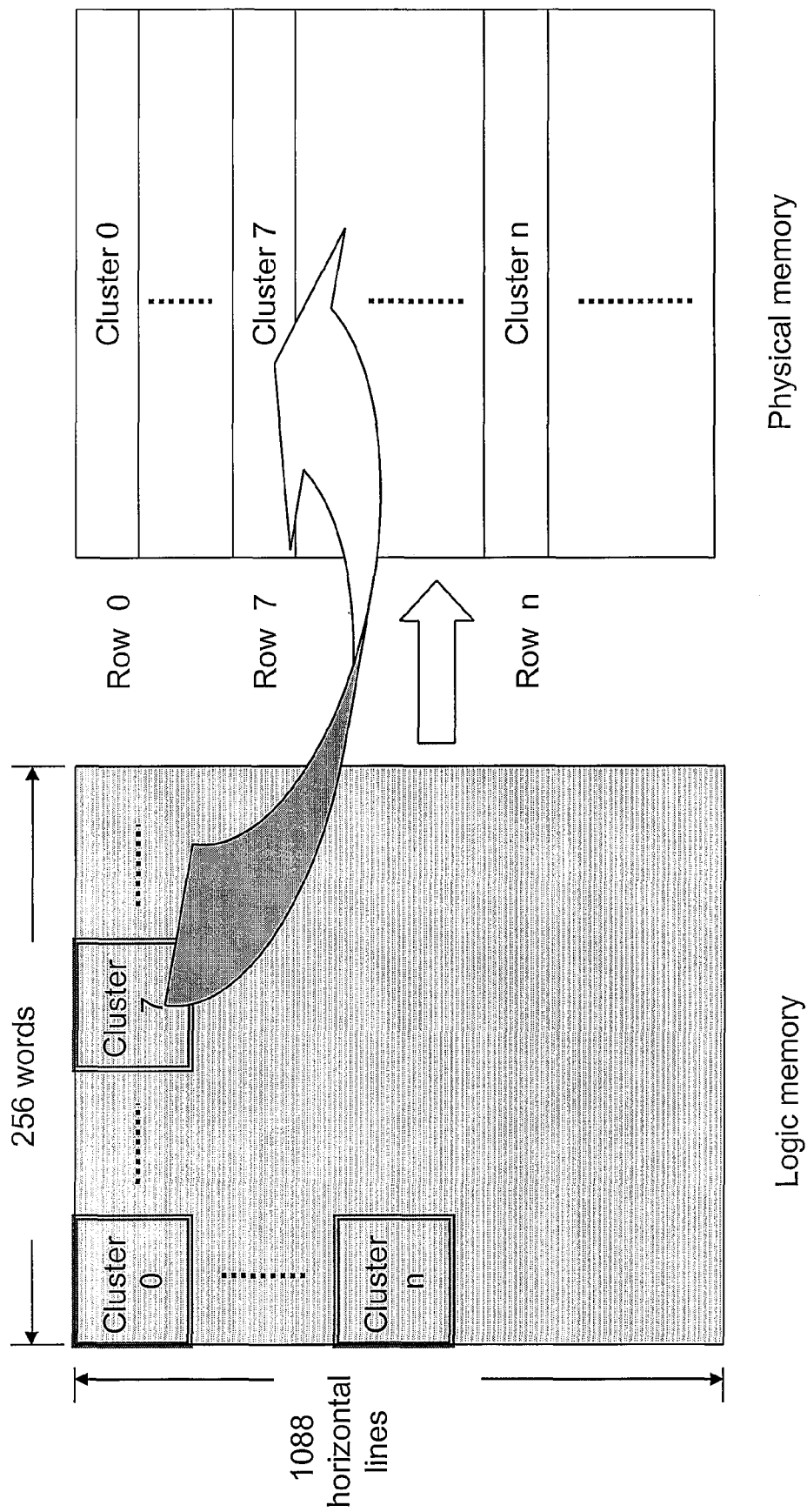
FIGS. 7~11 illustrate a method for mapping memory addresses according to an embodiment of the present invention.

FIG. 7 illustrates the row address mapping of Y data clusters in the present embodiment. Referring to FIG. 7, the logic memory is data arrays of Y component while physical memory may be an external SDRAM for storing all the video frames. Each Y data cluster corresponds to a row of the physical memory, and the row addresses thereof are arranged from top to bottom, from left to right. The row addresses of the Y data clusters can be obtained easily according to the positions of the Y data clusters in the corresponding frames or the addresses of the Y data clusters in the corresponding data arrays. Row addresses of CbCr data clusters are arranged similarly.

Figure 8:
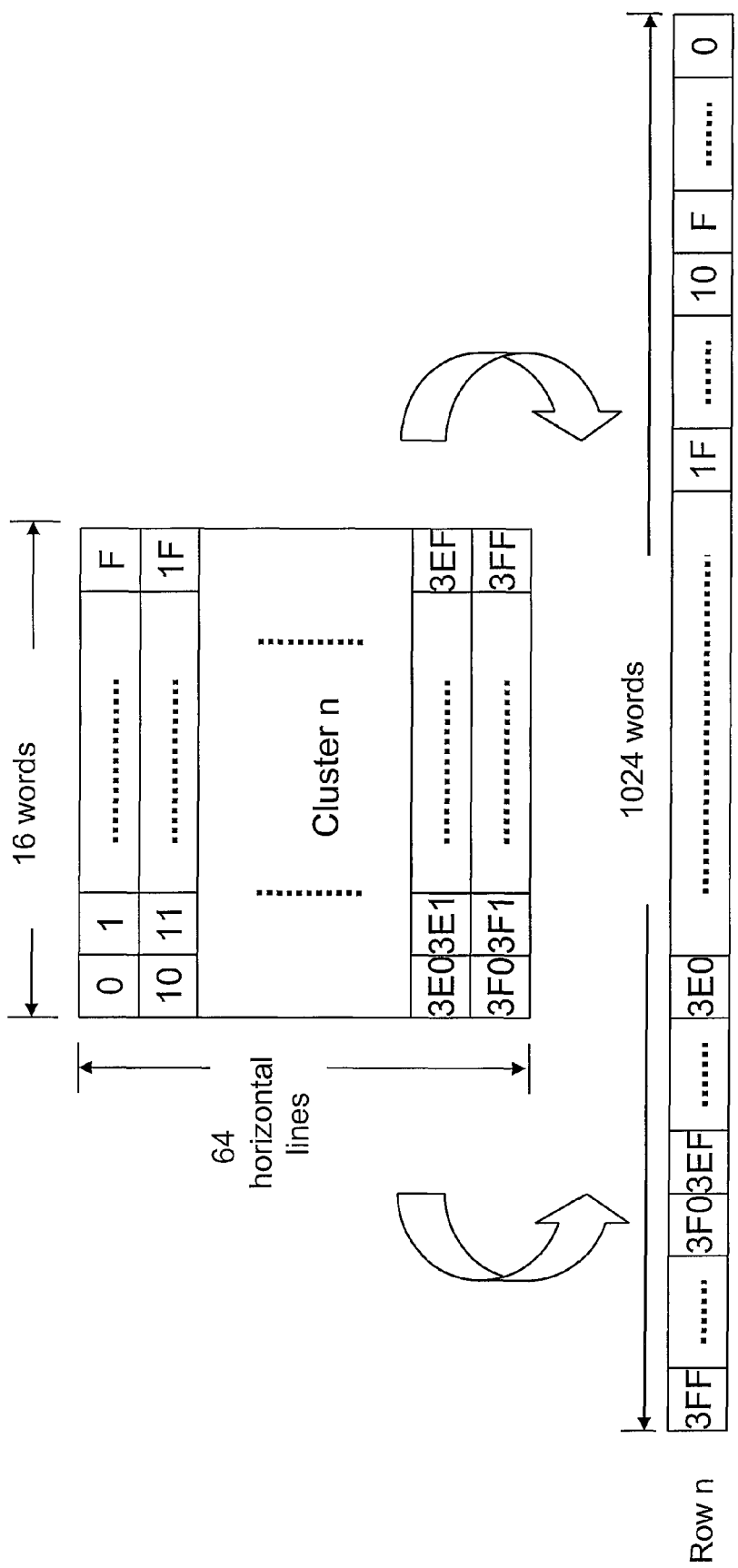

As described above, the words in the same data cluster have the same row address, and the column addresses thereof are as shown in FIG. 8. The arrangement of the column addresses are also from top to bottom, from left to right. The column addresses of the words can be easily obtained according to the addresses of the words in the corresponding data clusters.

Figure 9:
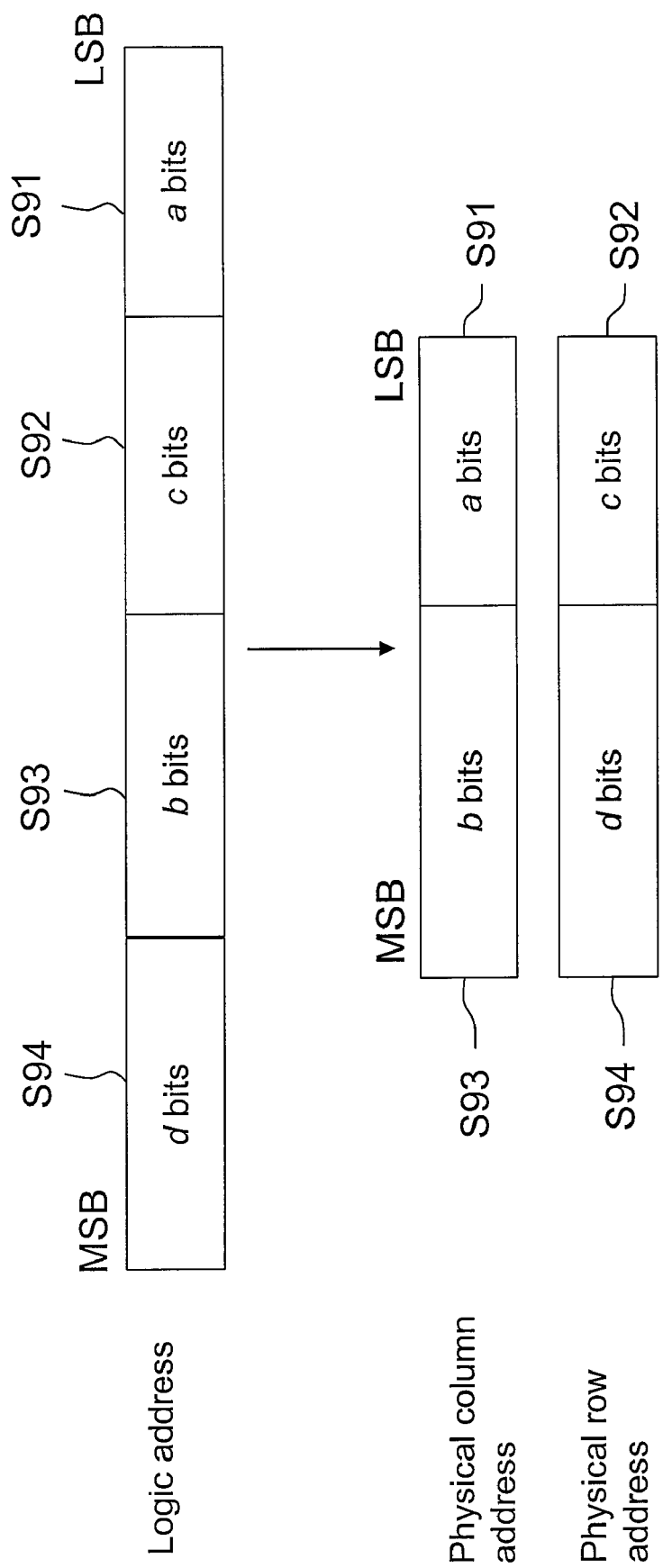

With the mapping method illustrated in FIG. 7 and FIG. 8, the logic address of each word in the data array can be mapped to a column address and a row address in the physical memory. A general memory mapping method is illustrated in FIG. 9. It is assumed that the width of each data cluster is $2^a$ words, the height thereof is $2^b$ horizontal lines, namely, $2^b$ pixels, and the width of a video frame is considered as $2^c$ data clusters, wherein a, b, and c are all predetermined positive integers. The logic address of a word in the video frame is sequentially divided into a first section S91 of a bits, a second section S92 of c bits, a third section S93 of b bits, and a fourth section S94 of d bits from the least significant bit (LSB) to the most significant bit (MSB), wherein d is the remaining of the bit number of the logic address deducted by a, b, and c. Accordingly, the four logic addresses S91~S94 can be arranged and combined to obtain the physical column address and the physical row address of the word. As shown in FIG. 9, the column address is formed by the first section S91 and the third section S93, wherein the first section S91 includes the LSB of the column address and the third section S93 includes the MSB of the column address. On the other hand, the row address is formed by the second section S92 and the fourth section S94, wherein the second section S92 includes the LSB of the row address and the fourth section S94 includes the MSB of the row address.

Figure 10:
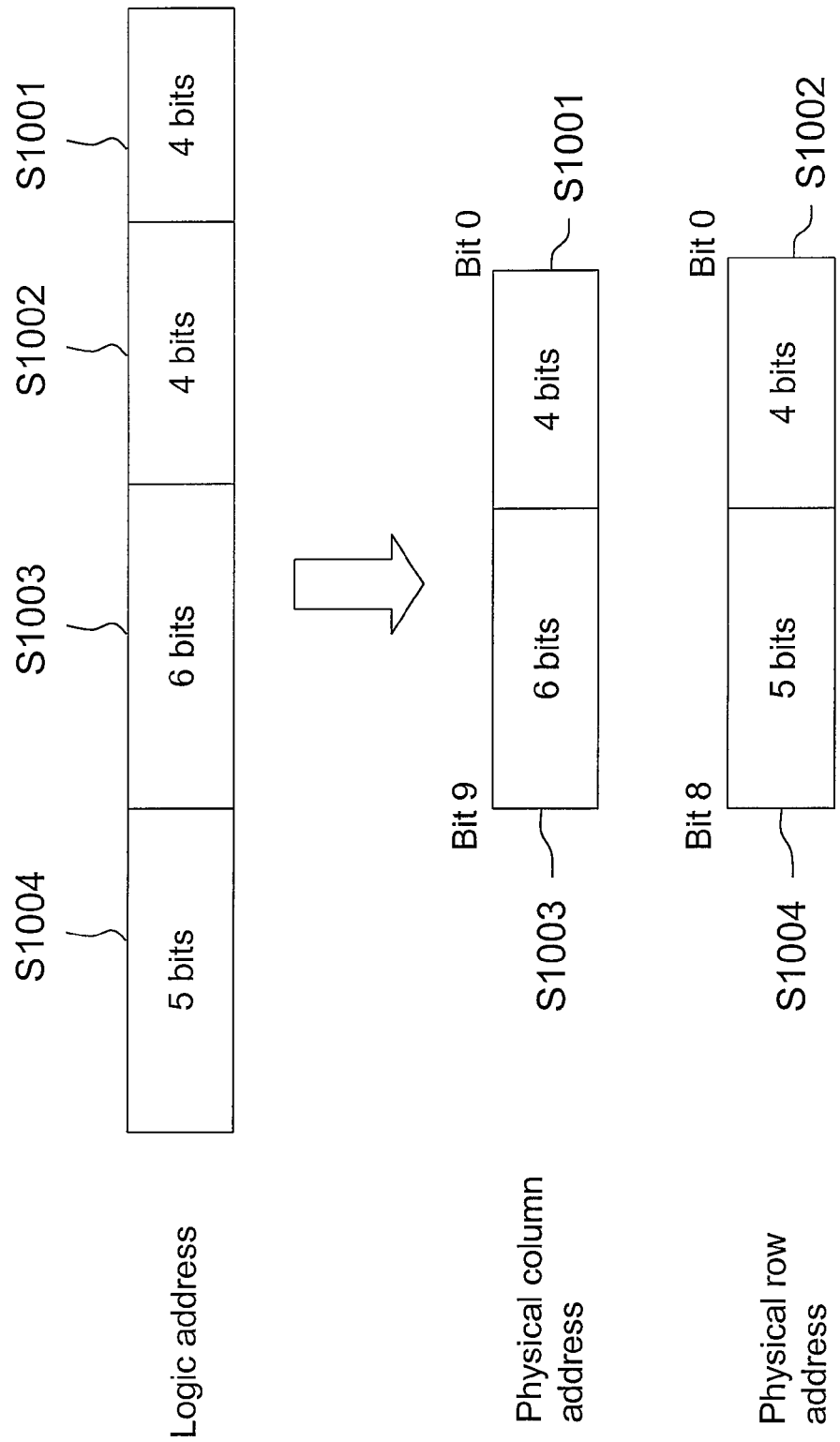
Figure 11:
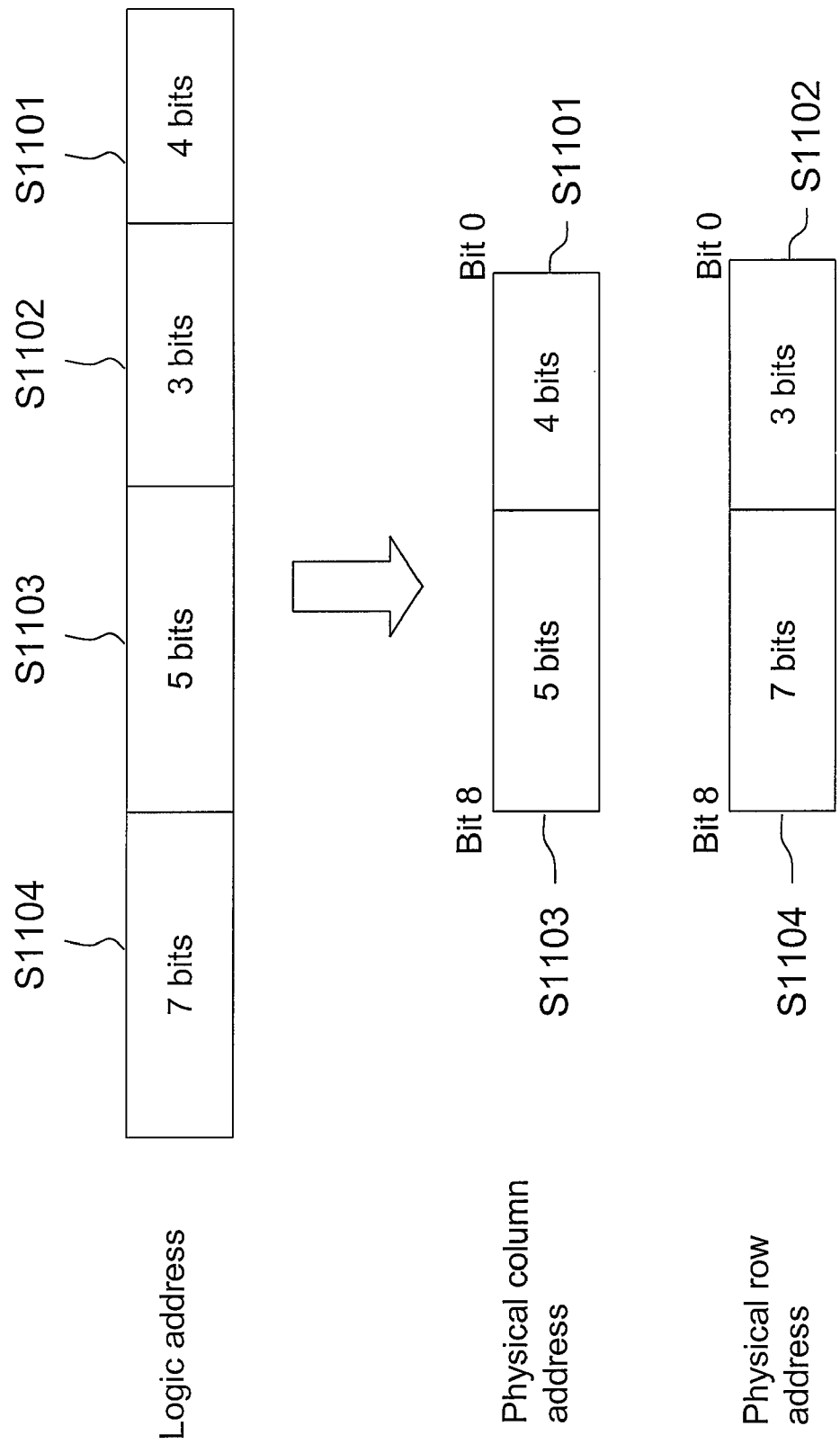

The contents illustrated in FIG. 10 and FIG. 11 can be obtained by implementing the address mapping method in FIG. 9 to the frame size and data cluster size of the present embodiment. FIG. 10 illustrates the address mapping method of Y component words in the present embodiment, wherein the width of each Y data cluster is $2^4$ words, the height thereof is $2^6$ horizontal lines, and the width of the Y data array is considered as $2^4$ Y data clusters. FIG. 11 illustrates the address mapping method of CbCr component words in the present embodiment, wherein the width of each CbCr data cluster is $2^4$ words, the height thereof is $2^5$ horizontal lines, and the width of the CbCr data array is considered as $2^3$ Y data clusters.

Figure 12:
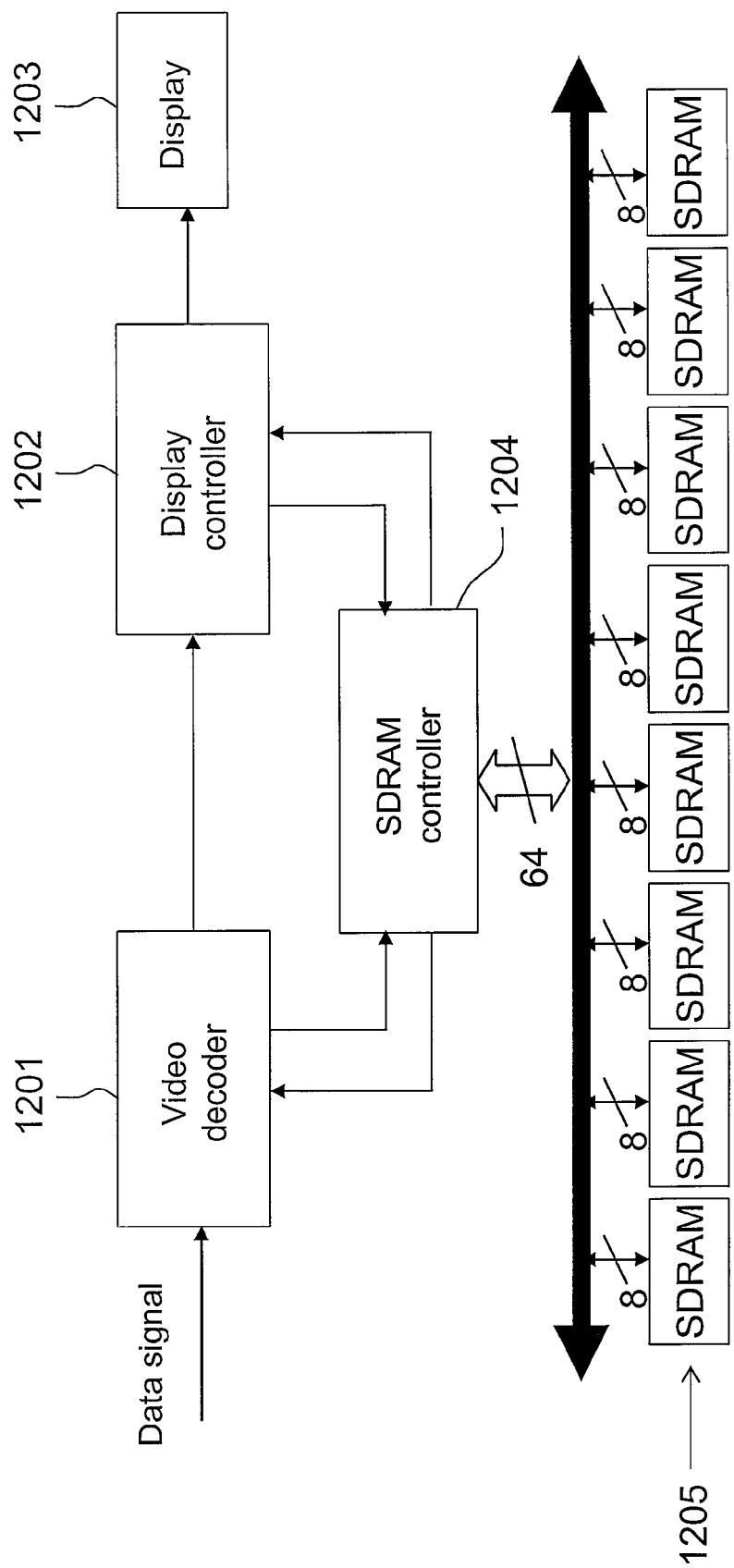
FIGS. 12~15 are schematic block diagrams of a SDRAM according to an embodiment of the present invention.
Figure 13:
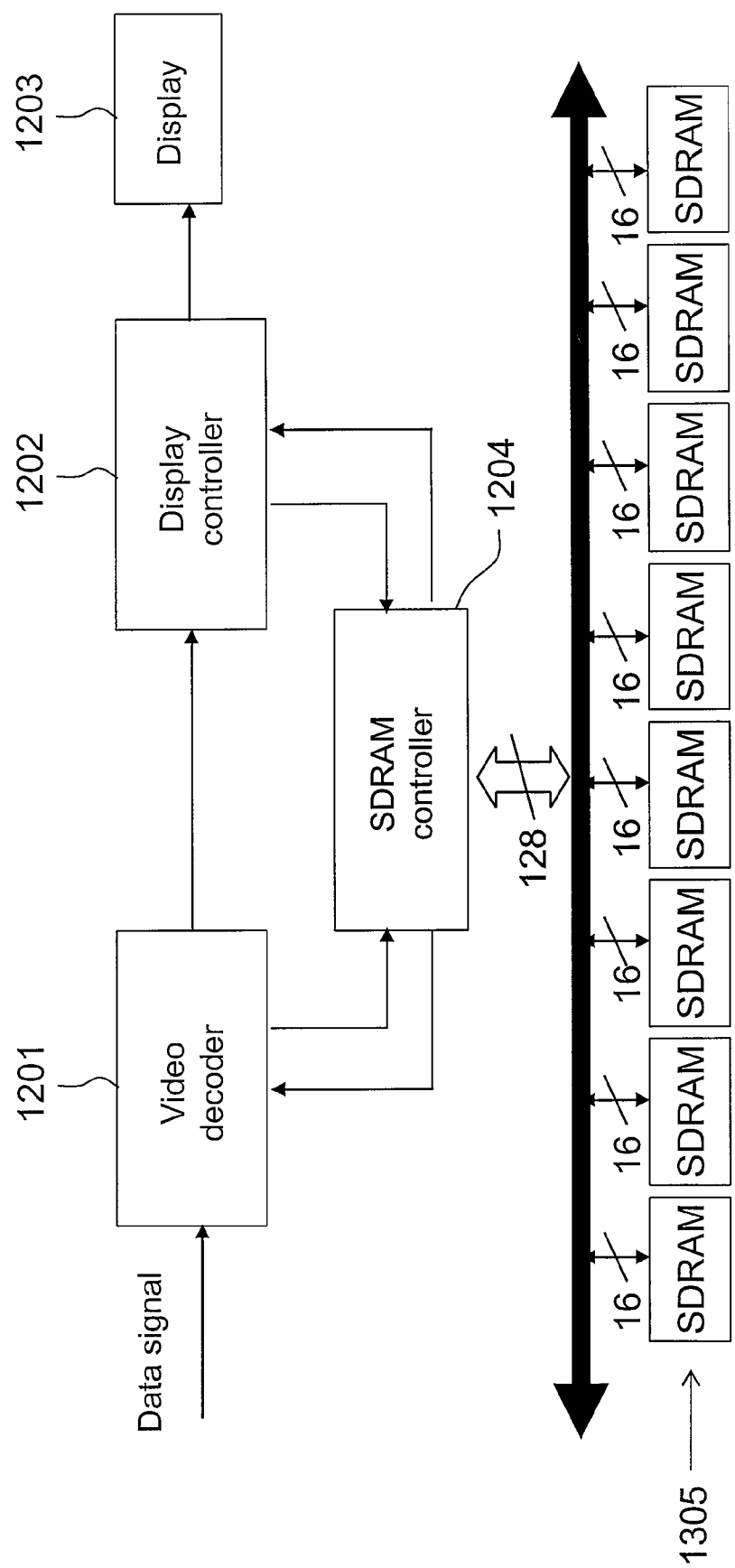
Figure 14:
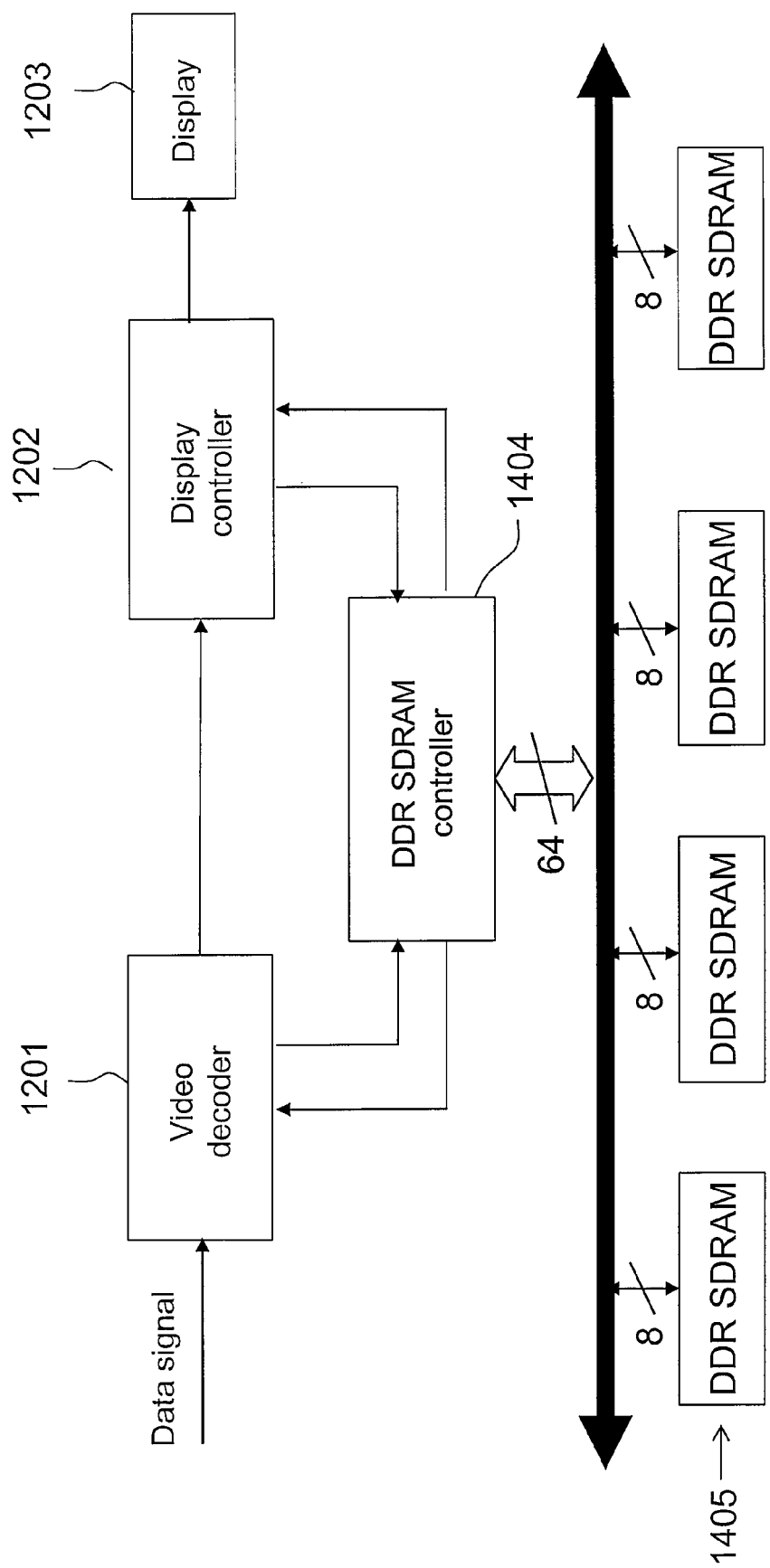
Figure 15:
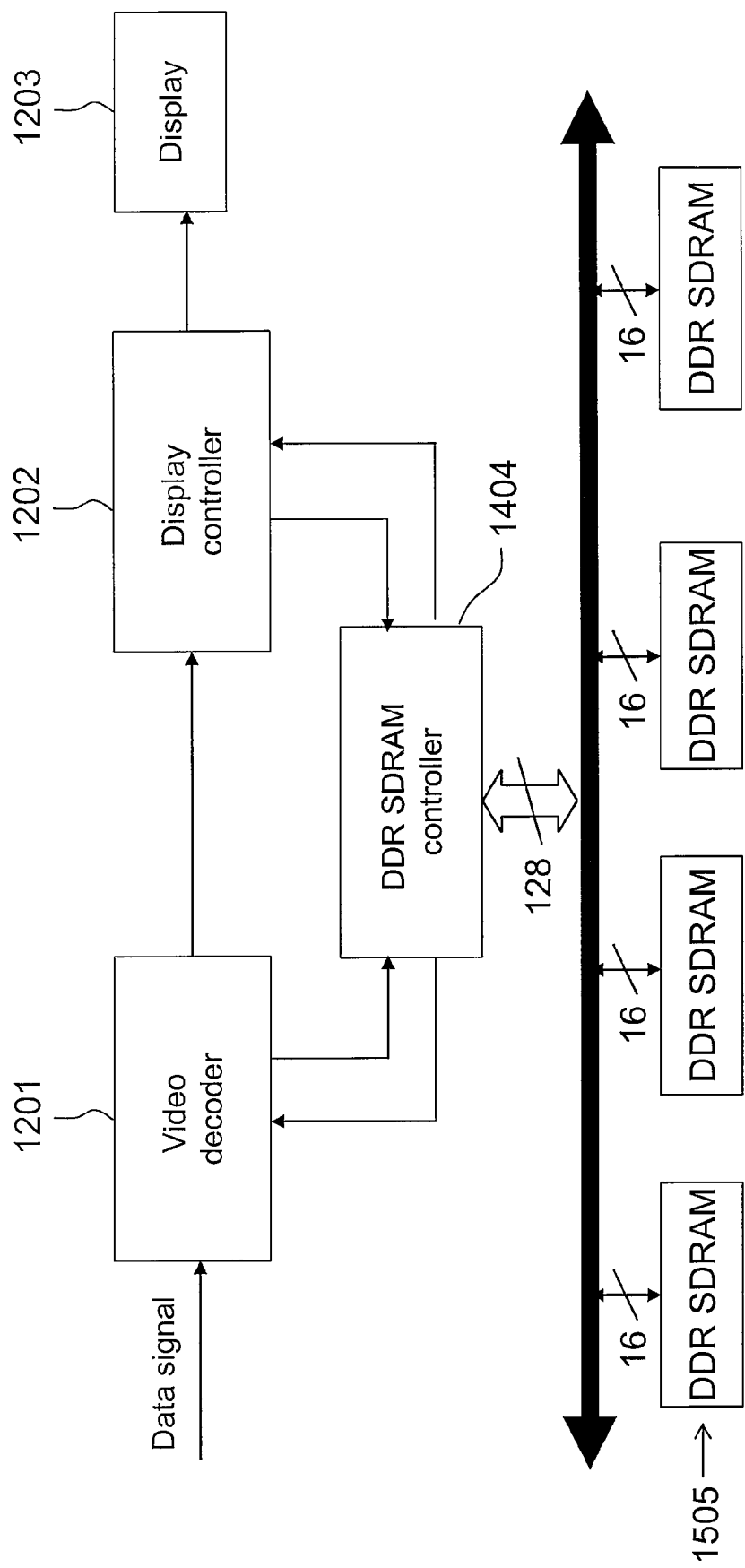

In the present embodiment, the length of a word is 64 bits, while the length of a word is not limited in the present invention. In the present invention, the length of a word is determined according to the total width of the data bus of the memory or memories. FIGS. 12~15 illustrate examples of memory structures in the present invention. The memory structure illustrated in FIG. 12 has 8 SDRAMs 1205, wherein the width of data bus in each SDRAM 1205 is 9 bits, thus, every time the SDRAM controller 1204 reads or writes a word of 64 bits. The structure illustrated in FIG. 13 has 8 SDRAMs 1305, wherein the width of data bus in each SDRAM 1305 is 16 bits, thus, every time the SDRAM controller 1204 reads or writes a word of 128 bits. The length of word in FIG. 12 and FIG. 13 is the width of the data bus in SDRAM, and if double data rate (DDR) SDRAM is used, the length of word is then two times of the width of the data bus in DDR SDRAM. The structure illustrated in FIG. 14 has 4 DDR SDRAMs 1405, wherein the width of data bus in each DDR SDRAM 1405 is 8 bits, thus, every time the DDR SDRAM controller 1404 reads or writes a word of 64 bits. The structure illustrated in FIG. 15 has 4 DDR SDRAMs 1505, wherein the width of data bus in each DDR SDRAM 1505 is 16 bits, thus, every time the DDR SDRAM controller 1404 reads or writes a word of 128 bits. The present invention is not limited to the usage of SDRAM or DDR SDRAM while other types of random access memory (RAM) may also be used.

Figure 16:
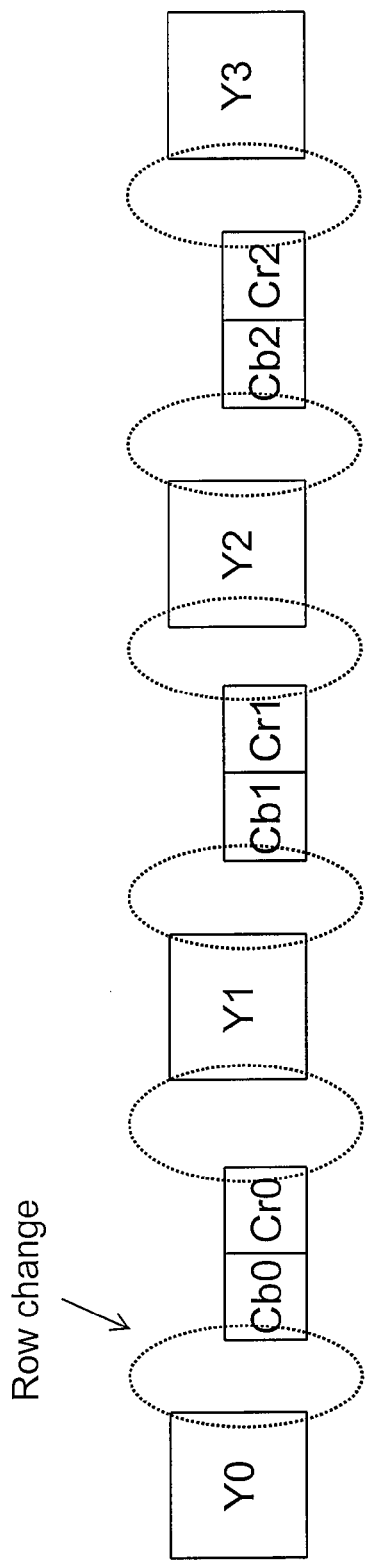
FIG. 16 illustrates a conventional macroblock accessing sequence.

FIG. 16 the macroblock access sequence of conventional video decoding. In conventional video decoding, regardless of read or write, a Y macroblock, for example, Y0, is accessed first, then a corresponding CbCr macroblock, for example, Cb0Cr0, is accessed, next, the next Y macroblock, for example, Y1, is accessed, and after that the CbCr macroblock, for example, Cb1Cr1, corresponding to the next Y macroblock is accessed, and so on. To simplify the description, here a dataset is defined as a set of data blocks of various types, and each block type includes at least one pixel component of a video frame. In the present embodiment, there are two types of data block, one is Y macroblock and the other one is CbCr macroblock. Accordingly, Y0 and Cb0Cr0 in FIG. 16 belong to the same dataset, Y1 and Cb1Cr1 belong to another dataset, and so on. All the macroblocks in each dataset correspond to all the pixel components in the video frame.

Since the data arrays of pixel component Y and pixel component CbCr are stored at different positions, the access sequence in FIG. 16 requires row change between each Y macroblock and each CbCr macroblock, and the number of row changes won't be reduced even the memory address mapping method in the present invention is adopted. For example, a video frame of 1920×1088 pixels has 8160 datasets, and in the access sequence in FIG. 16, each dataset requires two row changes, so the total row change number is 8160×2=16320.

Figure 17:
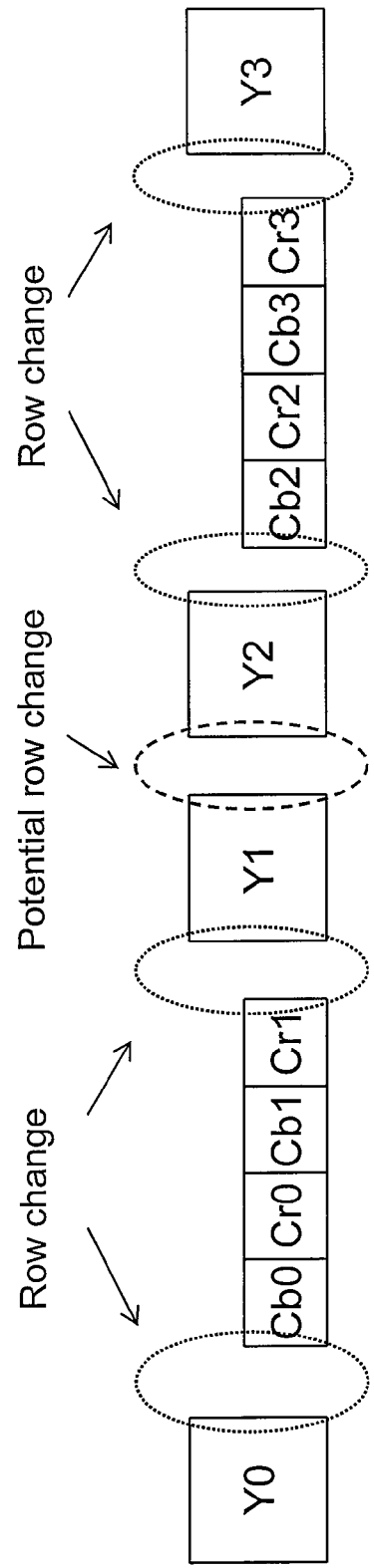
FIGS. 17~19 illustrate various macroblock accessing sequences according to various embodiments of the present invention.

The number of row changes can be reduced if the access sequence in FIG. 16 is adjusted slightly so that the macroblocks of every two datasets are arranged symmetrically, as shown in FIG. 17, and then the memory address mapping method in the present invention is adopted. In the present embodiment, 32 adjacent macroblocks belong to the same data cluster and are stored in the same row of the physical memory. The width of the data cluster is 8 macroblocks, thus, the possibility of row change between macroblocks Y1 and Y2 is ¼. The access sequence in FIG. 17 requires totally 8160+8160/8=9180 row changes.

Figure 18:
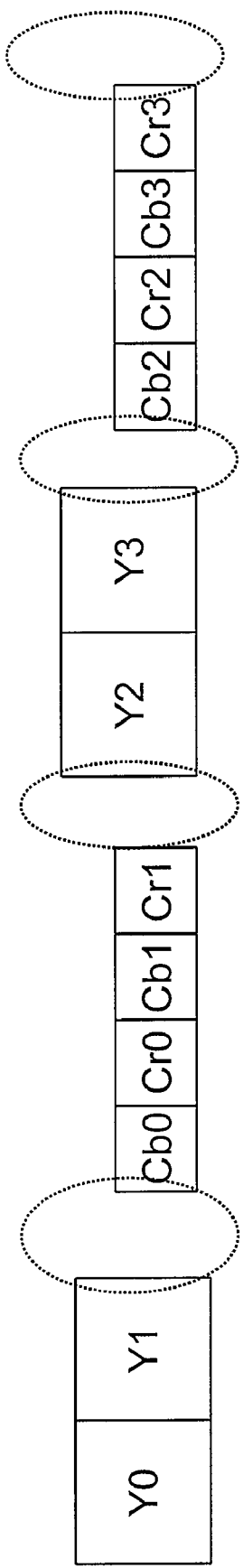
Figure 19:
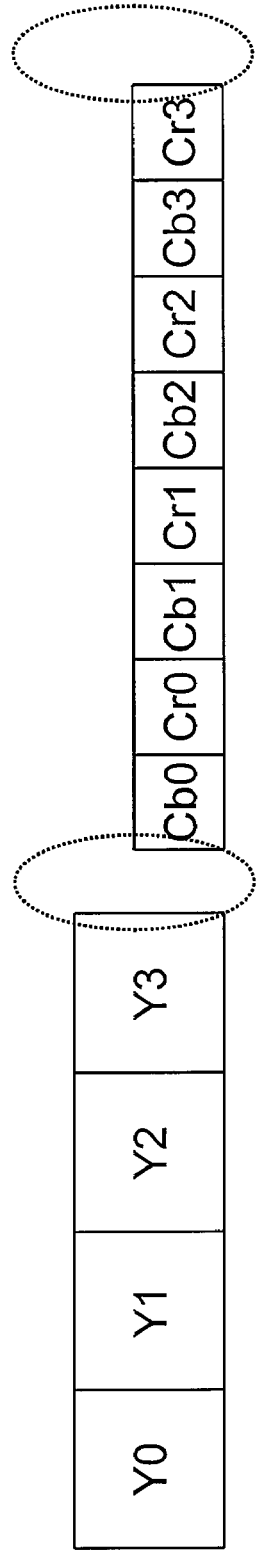

If the access sequence is further adjusted as shown in FIG. 18, that is, two Y macroblocks are accessed first and then two CbCr macroblocks are accessed, the total number of row changes may be reduced to 8160. If the access sequence is further adjusted as shown in FIG. 19, that is, four macroblocks are accessed first and then four CbCr macroblocks are accessed, the total number of row changes may be reduced to 8160/2=4080.

FIGS. 16~19 illustrate the memory accessing method in the present embodiment, which can greatly reduce the number of row changes in memory access along with the memory address mapping method in the present embodiment. How to implement the memory accessing method in the present embodiment in video decoding with hardware will be described below.

Figure 20:
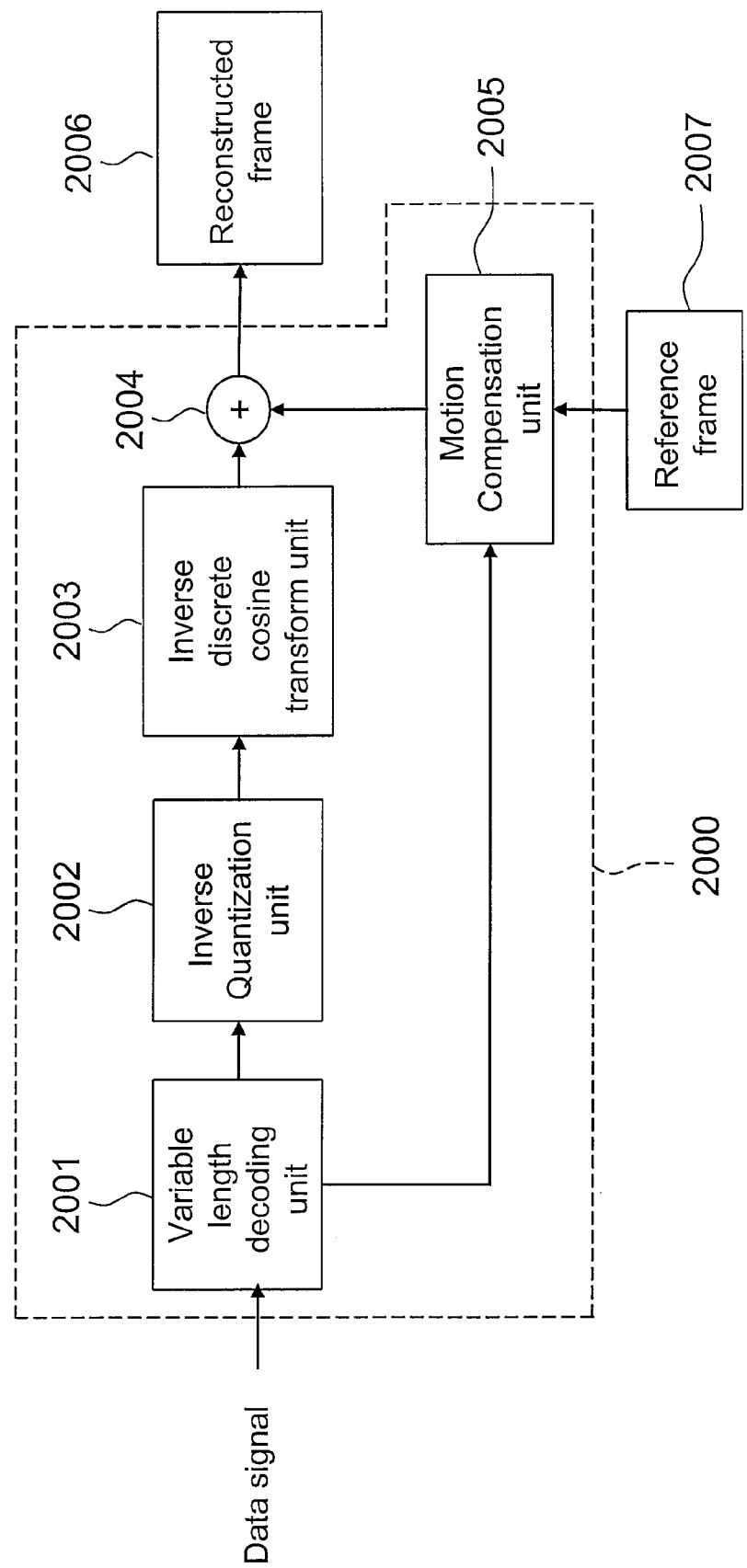
FIG. 20 is a schematic block diagram of a conventional video decoder.

FIG. 20 is a block diagram of a conventional video decoder 2000. The video decoder 2000 includes a variable length decoding unit 2001, an inverse quantization unit 2002, an inverse discrete cosine transform unit 2003, an adder 2004, and a motion compensation unit 2005. The video decoder 2000 receives a data signal compressed by a video encoder (not shown). According to the compressing procedure of a video encoder, the motion vector, motion difference, and residual data of a macroblock are first obtained through motion estimation. The residual data is converted from time domain to frequency domain through discrete cosine transform, and the conversion result is then compressed through quantization. Finally, the foregoing quantization result and the motion vector and motion difference previously generated are compressed through variable length encoding.

The decompressing procedure of the video decoder 2000 is corresponding to the compressing procedure described above. First, the variable length decoding unit 2001 receives a data signal from the video encoder, obtains the motion vector and motion difference of the macroblock from the data signal, and provides the motion vector and motion difference to the motion compensation unit 2005. The rest data signal is restored to a residual data by the inverse quantization unit 2002 and the inverse discrete cosine transform unit 2003. The motion compensation unit 2005 reads a corresponding macroblock from the reference frame 2007 according to the information provided by the variable length decoding unit 2001. Finally, the residual data and the macroblock of the reference frame are added by the adder 2004 to obtain the restored macroblock, and the restored macroblock is written into the reconstructed frame 2006. The reference frame 2007 and the reconstructed frame 2006 are both stored in an external memory, such as a SDRAM.

Figure 21:
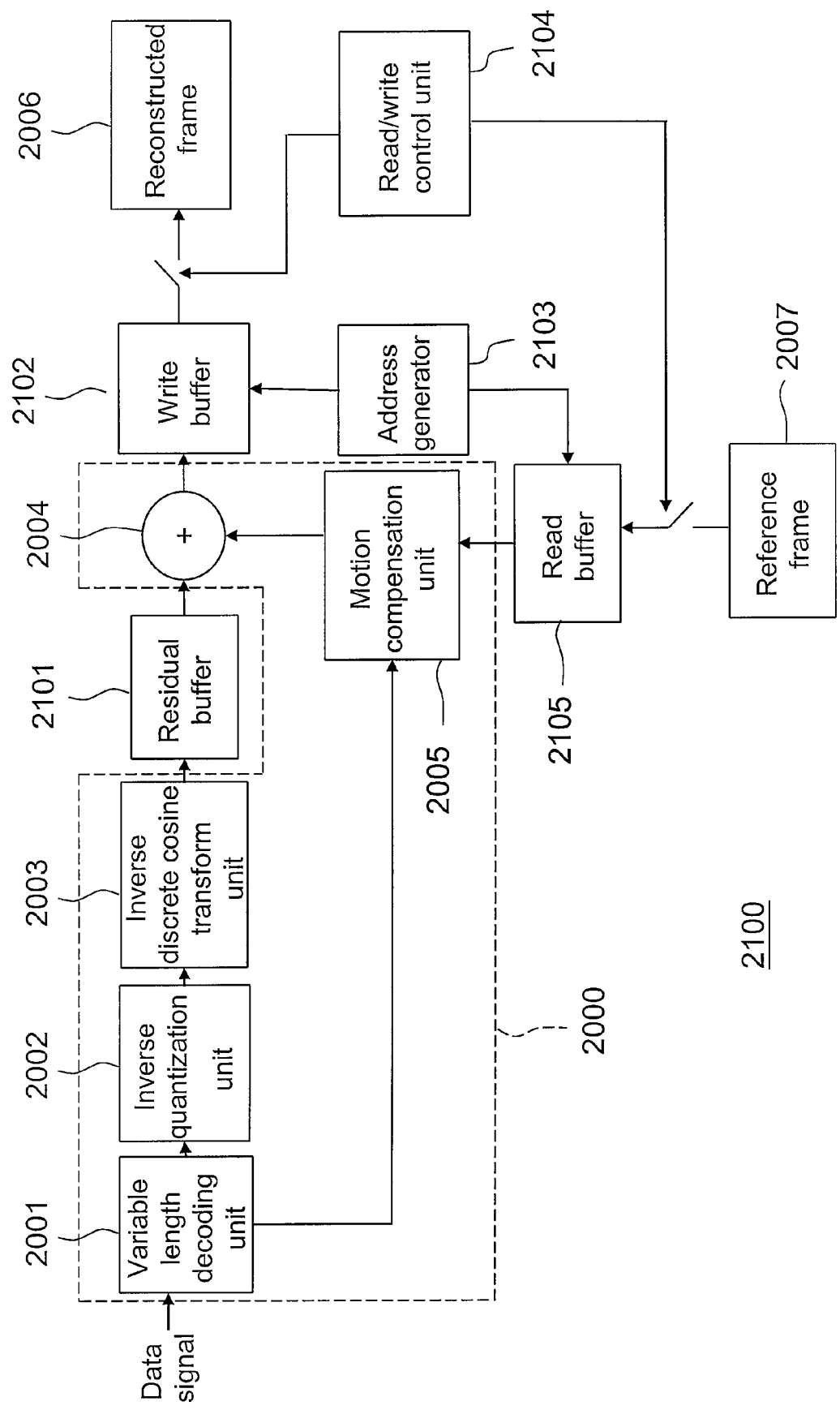
FIG. 21 is a schematic block diagram of a memory accessing apparatus according to an embodiment of the present invention.

Next, FIG. 21 is a block diagram of a memory accessing apparatus 2100 in the present embodiment. The memory accessing apparatus 2100 is used for implementing the memory accessing method in the present embodiment. Besides the video decoder 2000 in FIG. 20, there are also a residual buffer 2101, a read buffer 2105, a write buffer 2102, an address generator 2103, and a read/write control unit 2104.

To reduce the number of row changes during video decoding, the access sequence in FIG. 19 has to be adopted by the memory accessing apparatus 2100, however, the video decoder 2000 still uses the conventional access sequence as shown in FIG. 16, thus, the residual buffer 2101, the read buffer 2105, and the write buffer 2102 are required for providing required conversions between the two access sequences. The read buffer 2105 reads datasets of the reference frame 2007 from the external memory according to the read addresses provided by the address generator 2103 and provides the datasets to the motion compensation unit 2005 of the video decoder 2000. The write buffer 2102 receives the restored datasets from the adder 2004 of the video decoder 2000 and writes the restored datasets into the external memory according to the write addresses provided by the address generator 2103. The residual buffer 2101 stores the residual data obtained by the video decoder 2000 from the data signal and provides the residual data to the adder 2004 to generate the restored datasets. Since the motion compensation unit 2005 outputs in macroblocks and the residual data output by the inverse discrete cosine transform unit 2003 can only be rebuilt with complete datasets, the residual data has to be stored by the residual buffer 2101. In the present embodiment, the residual buffer 2101 is a first in first out (FIFO) queue which can store 4 residual data.

Figure 22:
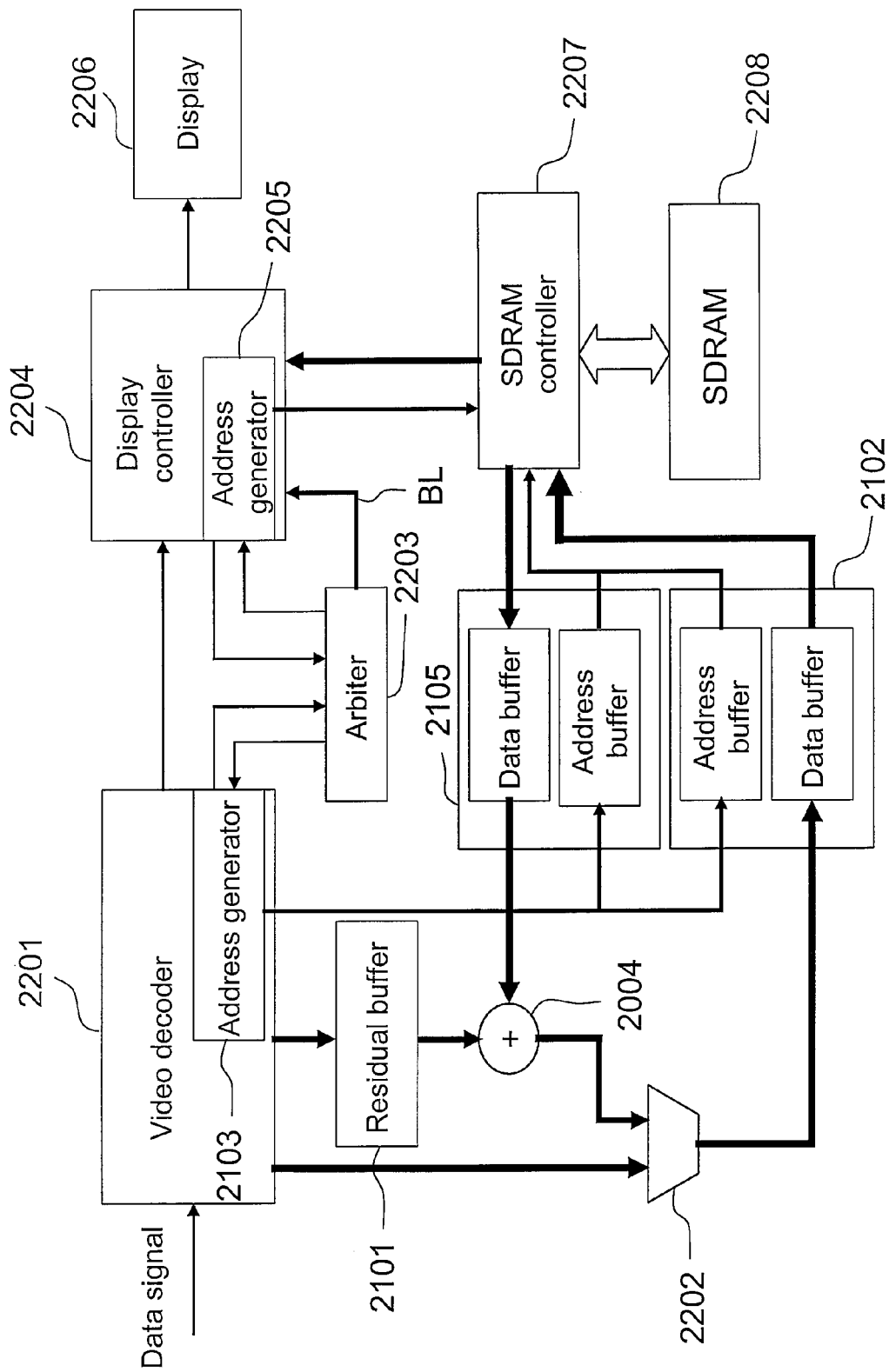
FIG. 22 is a schematic block diagram of a video decoding and display system according to an embodiment of the present invention.

The rebuilt video frame can be displayed, and a system with a video decoder and a display is illustrated in FIG. 22. Wherein the multiplexer 2202 transmits macroblocks which do not need motion compensation directly from the video decoder 2201 to the write buffer 2102 and transmits macroblocks which require motion compensation from the adder 2004 to the write buffer 2102. The display controller reads data of video frames from the SDRAM 2208 according to a predetermined scan order and provides the data to the display 2206 to display the video frames. The arbiter coordinates the accesses of the video decoder 2201 and the display controller 2204 to the SDRAM 2208 so as to prevent the two from accessing the SDRAM 2208 at the same time and to allow the video decoder 2201 to take precedence.

The arbiter 2203 appoints the quantity of data every time the display controller 2204 can read from the SDRAM 2208 to be BL, and BL is a predetermined value, which is the burst length of the SDRAM 2208. An optimum predetermined burst length BL may be set to the width of each data cluster, namely, the maximum reading quantity which requires no row change.

The display controller 2204 includes an address generator 2205 for providing addresses required by the display controller 2204 for reading video frame data. The other address generator 2103 provides the read addresses required by the read buffer 2105 and the write addresses required by the write buffer 2102. The address generators 2103 and 2205 both use the memory address mapping method in the present embodiment for generating addresses. The display controller 2204, the read buffer 2105, and the write buffer 2102 all access the SDRAM 2208 through the SDRAM controller 2207.

Figure 23:
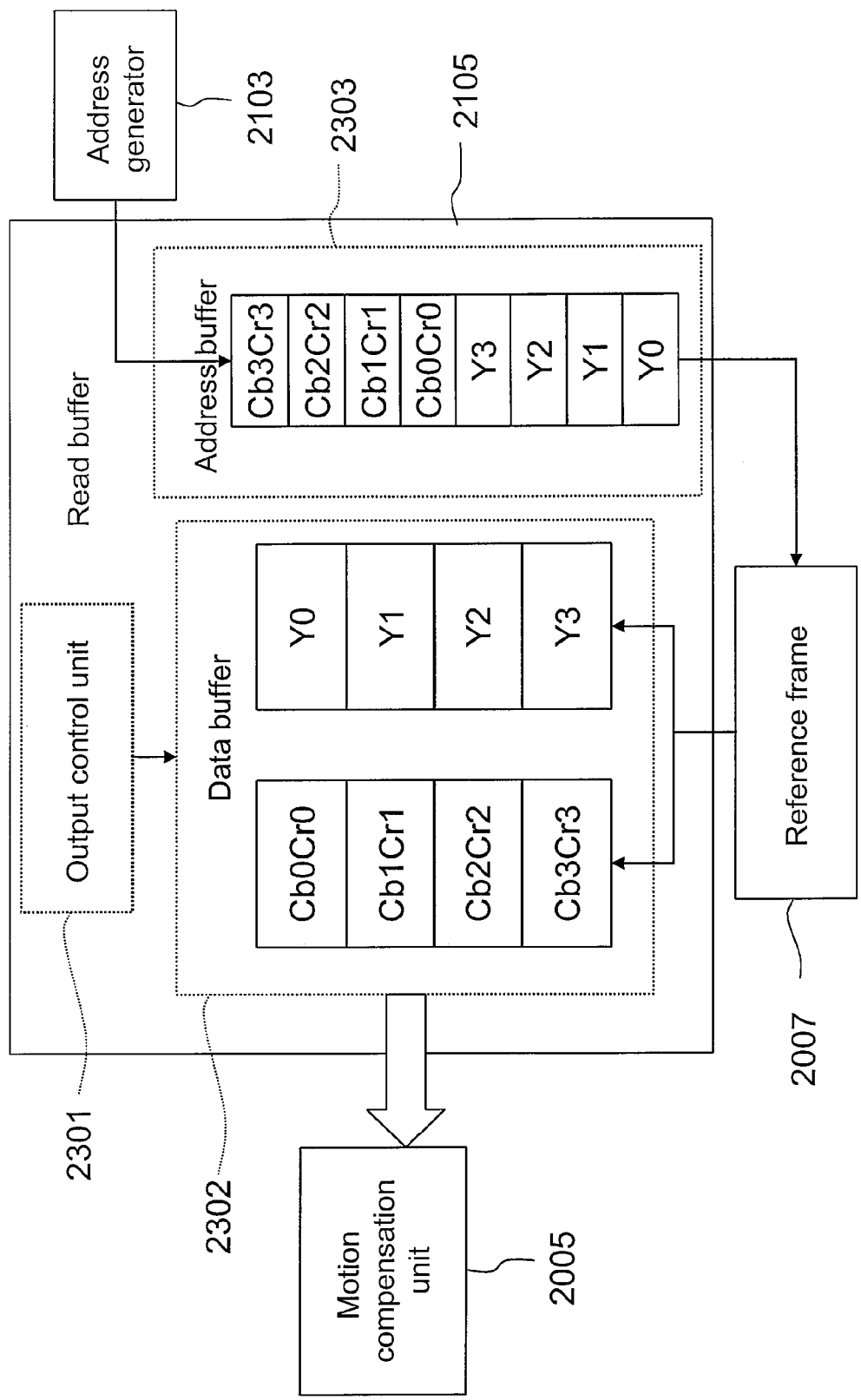
FIG. 23 is a schematic block diagram of a read buffer according to an embodiment of the present invention.

FIG. 23 is a block diagram of a read buffer 2105. The read buffer 2105 includes an output control unit 2301, a data buffer 2302, and an address buffer 2303.

The data buffer 2302 stores macroblocks read from the reference frame 2007, and which can accommodate four Y macroblocks (Y0-Y3) and four CbCr macroblocks (Cb0Cr0-Cb3Cr3). Actually to meet the requirement of video decoding, the read buffer 2105 also reads a pixel data adjacent to a macroblock when the read buffer 2105 reads the macroblock from the reference frame 2007. Thus, the volume of each storage unit of the data buffer 2302 is slightly larger than a macroblock. The size of each of the Y macroblock Y0~Y3 is 2×16 words, since there is an extra pixel data and the minimum unit of memory access is word, the volume of each storage unit of the Y macroblock Y0~Y3 has to be 3×17 words, namely, 51 words. Similarly, the size of each of the CbCr macroblocks Cb0Cr0~Cb3Cr3 is 2×8 words, and since there is respectively an extra pixel data in the pixel component Cb and the pixel component Cr, the volume of each storage unit of the CbCr macroblocks Cb0Cr0~Cb3Cr3 has to be 3×9 words, namely, 27 words.

The address buffer 2303 stores the read addresses provided by the address generator 2103 for reading the macroblocks stored in the data buffer 2302. The output control unit 2301 determines the order in which the data buffer 2302 provides the macroblocks to the video decoder 2000 according to the type of the video frame which is being decoded by the video decoder 2000.

The read buffer 2105 reads macroblocks from the external memory in the order of the types of the macroblocks, which means, the read buffer 2105 continuously reads a particular type of macroblocks first and then continuously reads the next type of macroblocks. As shown in FIG. 19, the order in which the read buffer 2105 reads macroblocks from the external memory is determined by the read addresses provided by the address generator 2103. The read buffer 2105 provides the macroblocks to the video decoder 2000 in the order of the datasets, such as the order in FIG. 16, which means, the read buffer 2105 provides various types of macroblocks of a particular dataset to the video decoder 2000 first, and then provides various types of macroblocks of the next dataset to the video decoder 2000. Such an order is determined by the output control unit 2301. The read buffer 2105 has different output orders when the video decoder 2000 decodes different types of video frames. The read buffer 2105 has no output since no reference frame is required at decoding an I frame. The output order at decoding a P frame is Y0, Cb0Cr0, Y1, Cb1Cr1, Y2, Cb2Cr2, Y3, and Cb3Cr3. The output order at decoding a B frame is Y0, Cb0Cr0, Y2, Cb2Cr2, Y1, Cb1Cr1, Y3, and Cb3Cr3.

Figure 24:
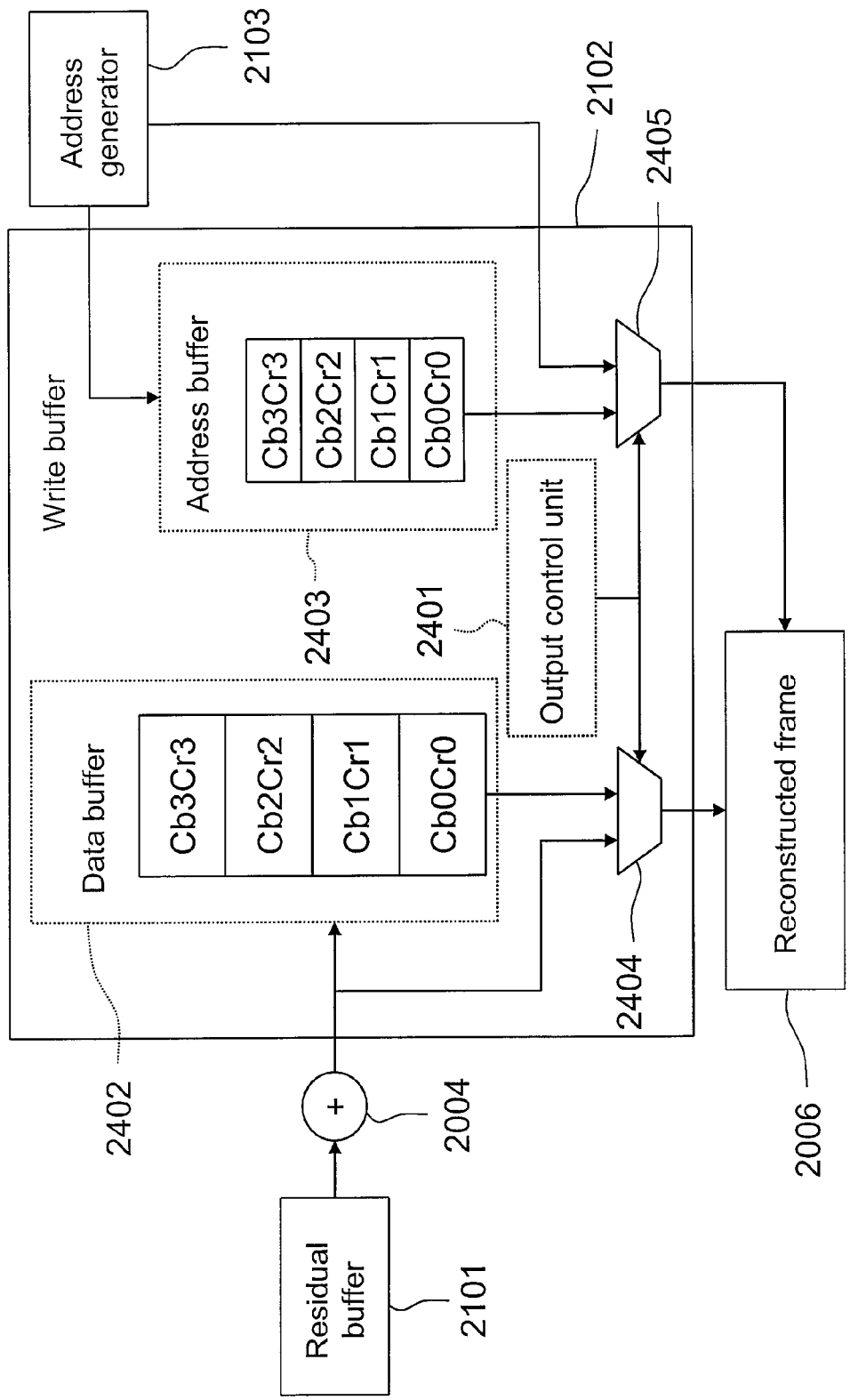
FIG. 24 is a schematic block diagram of a write buffer according to an embodiment of the present invention.

FIG. 24 is a block diagram of the write buffer 2102. The write buffer includes an output control unit 2401, a data buffer 2402, an address buffer 2403, and multiplexers 2404 and 2405. The data buffer 2402 stores CbCr macroblocks receives from the video decoder 2000 and which can accommodate four CbCr macroblocks. The data buffer 2402 does not store Y macroblocks because Y macroblocks are directly written into the external memory once they are received. The writing of the macroblocks does not involve the adjacent macroblocks, thus, the size of each storage unit of the data buffer 2402 is the same as that of the CbCr macroblocks, which is, 2×8 words.

The address buffer 2403 stores the write addresses provided by the address generator 2103 to write the macroblocks stored in the data buffer 2402 into the external memory.

The write buffer 2102 receives macroblocks from the adder 2004 in the order of the datasets as shown in FIG. 16, which is, the write buffer 2102 receives various types of macroblocks of a particular dataset first and then receives various types of macroblocks of the next dataset. Such an order is determined by the video decoder 2000. The write buffer 2102 outputs macroblocks to the external memory in the order of the types of the macroblocks as shown in FIG. 19, which is, the write buffer 2102 writes a particular type of macroblocks continuously first and then writes the next type of macroblocks continuously. Such an order is determined by the output control unit 2401.

The output control unit 2401 controls the multiplexers 2404 and 2405 to output selectively so as to control the transmission path of the macroblocks in the write buffer 2102. When the write buffer 2102 receives Y macroblocks, the output control unit 2401 controls the multiplexers 2404 and 2405 so that the Y macroblocks and the write addresses provided by the address generator 2103 are directly output to the SDRAM controller to be directly written into the reconstructed frame memory 2006. When the write buffer 2102 receives CbCr macroblocks, the output control unit 2401 stores the CbCr macroblocks into the data buffer 2402 first, and after the Y macroblocks have been written, the write buffer 2102 outputs the CbCr macroblocks stored in the data buffer 2402 and the write addresses stored in the address buffer 2403 to the SDRAM controller to write the CbCr macroblocks into the reconstructed frame memory 2006.

The read/write control unit 2104 has two functions in the structure shown in FIG. 21. Firstly, the read/write control unit 2104 disables the read buffer 2105 and the write buffer 2102 when the arbiter prevents the video decoder 2000 from accessing the external memory. Secondly, the read/write control unit 2104 controls the number, type, and order of the read buffer 2105 reading datasets and the number and type of the write buffer 2102 writing the datasets according to the type of the video frame which is being decoded.

Figure 25:
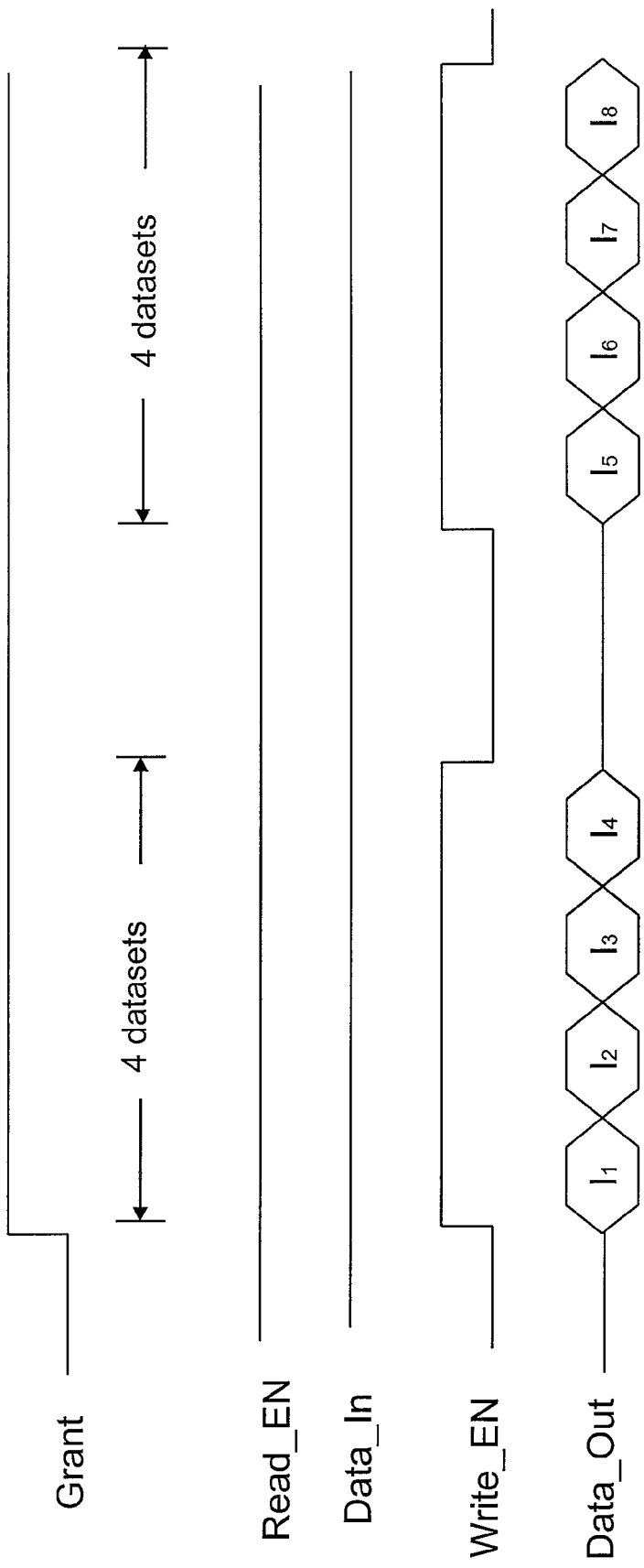
FIGS. 25~27 illustrate the access order of a dataset according to an embodiment of the present invention.
Figure 26:
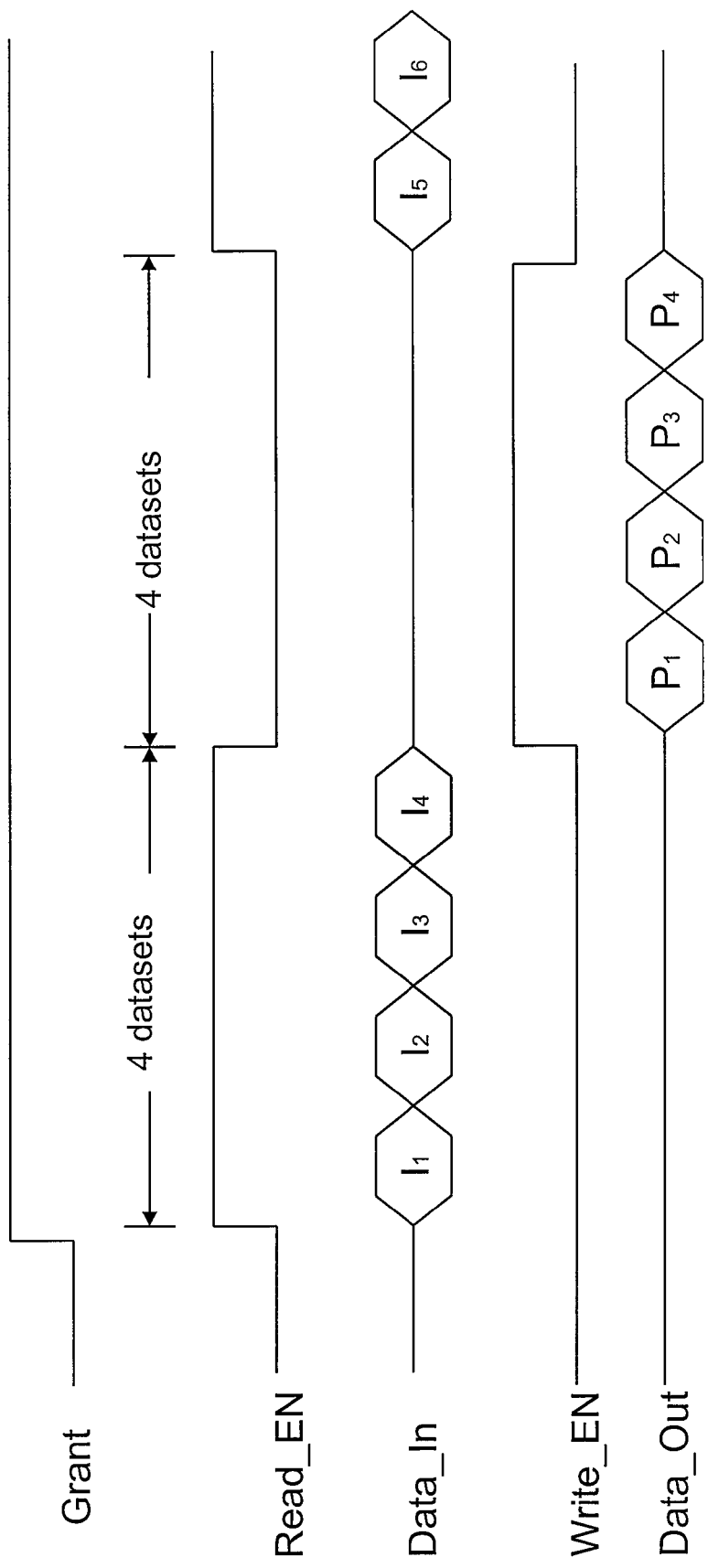
Figure 27:
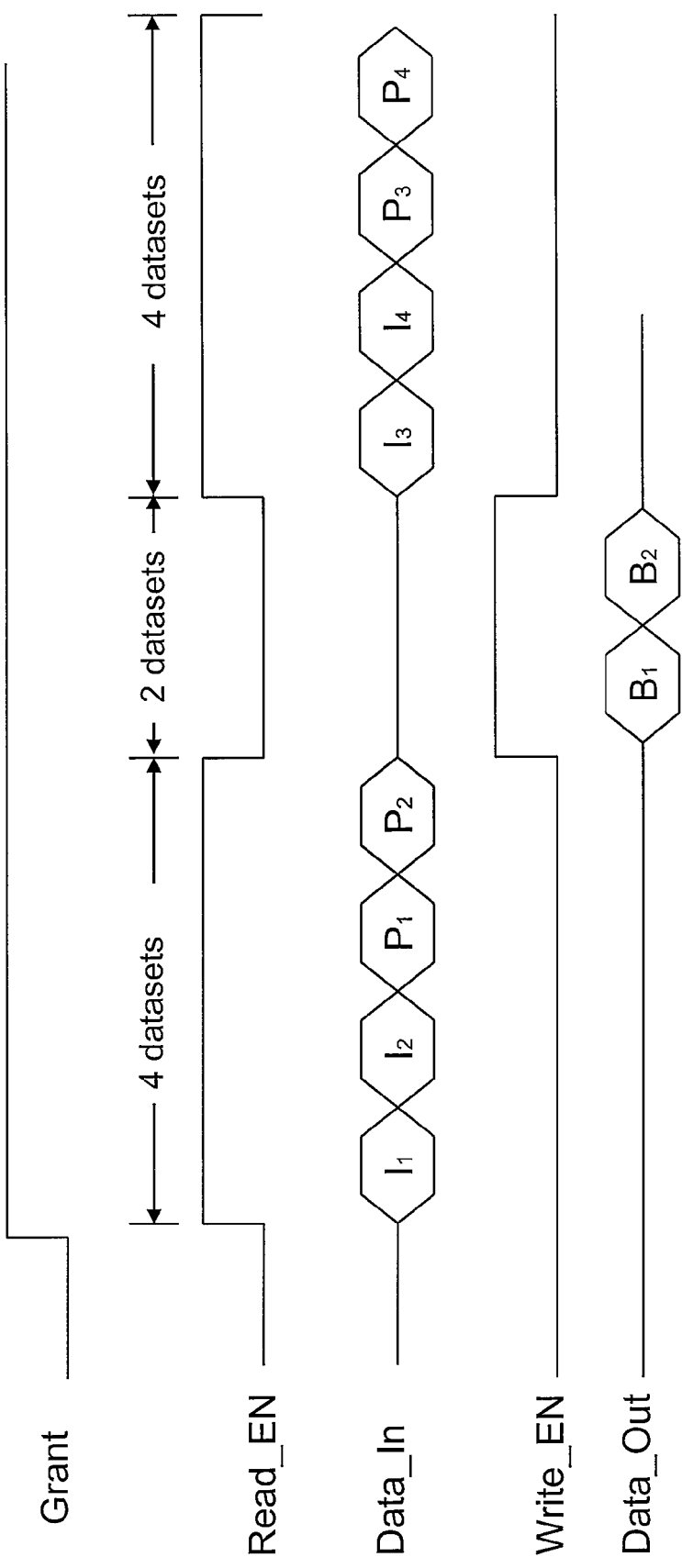

FIGS. 25~27 illustrate the timings of data access and relative signals at decoding various types of frames. Wherein Grant represents that the arbiter allows usage to the external memory, Read_EN is a read enable signal of the external memory, Data_In is data read from the external memory, Write_EN is a write enable signal of the external memory, and Data_Out is data to be written into the external memory.

When decoding a I frame, as shown in FIG. 25, since no reference frame is required, the read/write control unit 2104 disables the read buffer 2105 and controls the write buffer 2102 to write four datasets, for example, datasets $I_1$~$I_4$, to the I frame continuously at every time the memory is accessed, wherein the write order of the macroblocks is as shown in FIG. 19.

When decoding a P frame, as shown in FIG. 26, the read/write control unit 2104 controls the read buffer 2105 to continuously read four datasets, for example, datasets $I_1$~$I_4$ from the I frame and then controls the write buffer 2102 to continuously write four datasets, for example, datasets $P_1$~$P_4$ to the P frame at every time the memory is accessed, wherein the read or write order of the macroblocks is as shown in FIG. 19.

Figure 28:
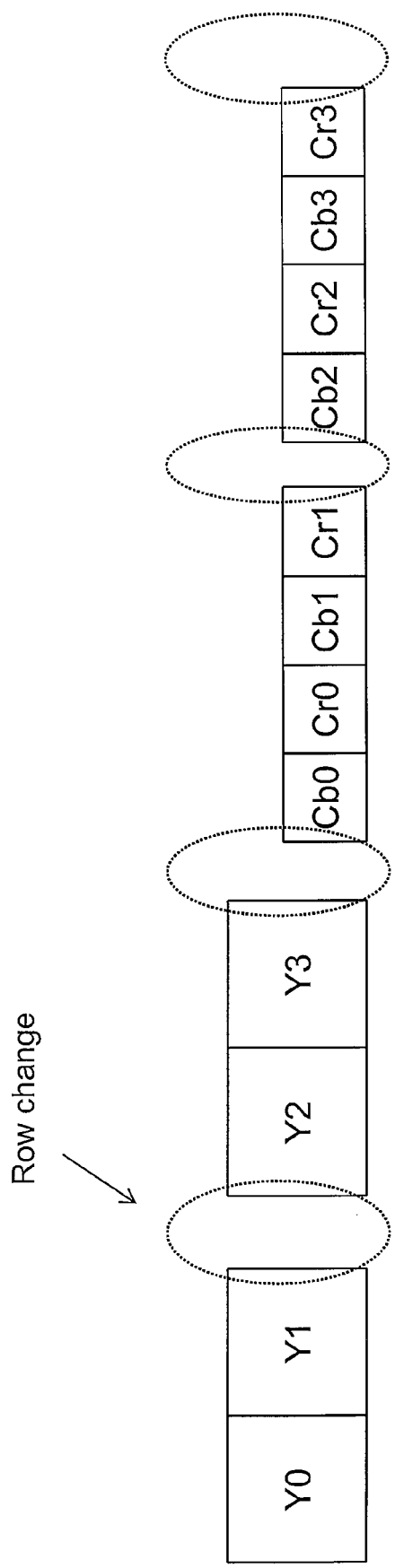
FIG. 28 illustrates the access sequence of macroblocks according to an embodiment of the present invention.

When decoding a B frame, as shown in FIG. 27, at every time the memory is accessed, the read/write control unit 2104 controls the read buffer 2105 to continuously read two datasets, for example, datasets $I_1$~$I_2$ from the I frame first and then continuously read two datasets, for example, datasets $P_1$~$P_2$ from the P frame, and then the read/write control unit 2104 controls the write buffer 2102 to continuously write two datasets, for example, $B_1$-$B_2$, to the B frame. Since different types of video frames are stored at different areas in the external memory, the read or write order of macroblocks in FIG. 27 is as shown in FIG. 28.

The experimental data of the present embodiment will be described below. In the experiment, a video frame of 1920×1088 pixels is used, and the frame has totally 8160 datasets, namely, 8160 Y macroblocks and 8160 CbCr macroblocks. In the present embodiment, the improvements to the decoding of I frame, P frame, and B frame are respectively listed in following tables 1~3. The conventional access sequence is as shown in FIG. 16, and the total number of clock cycles is equal to the addition of the clock cycles required by data access and the multiplication of the clock cycles required by row changes and the number of row changes. As shown in table 1~3, the number of row changes and the required clock frequency at accessing the memory can be greatly reduced in the present embodiment.

TABLE 1

Efficiency Improvement of I Frame

| | Clock cycles required by data access | Clock cycles required by row changes | Number of row changes | Total number of clock cycles | Required clock frequency |
|---|---|---|---|---|---|
| Address rearrangement + conventional memory access | 391680 | 6 | 16320 | 489600 | 100 MHz |
| Present embodiment | 391680 | 6 | 4080 | 414160 | 84.7 MHz |

TABLE 2

Efficiency Improvement of P Frame

| | Clock cycles required by data access | Clock cycles required by row changes | Number of row changes | Total number of clock cycles | Required clock frequency |
|---|---|---|---|---|---|
| Address rearrangement + conventional memory access | 1028160 | 6 | 32640 | 1224000 | 100 MHz |
| Present embodiment | 1028160 | 6 | 8160 | 1077120 | 88 MHz |

TABLE 3

Efficiency Improvement of B Frame

| | Clock cycles required by data access | Clock cycles required by row changes | Number of row changes | Total number of clock cycles | Required clock frequency |
|---|---|---|---|---|---|
| Address rearrangement + conventional memory access | 1664640 | 6 | 48960 | 1958400 | 100 MHz |
| Present embodiment | 1664640 | 6 | 20400 | 1787040 | 91.25 MHz |

The present invention is not limited to the present embodiment, for example, the size of data clusters in the present embodiment is 32 macroblocks because each row of SDRAM contains exactly 32 macroblocks. While in other embodiments, if memories of different sizes are used, the size of data clusters has to be adjusted accordingly so that an entire data cluster can be stored in the same row of the memory.

In the present embodiment, the residual memory stores four residual data, the read buffer stores four datasets, and the write buffer stores four macroblocks. While in other embodiments, the foregoing numbers can be replaced with any multiples of four such as 8, 12, 16, etc.

In the present embodiment, there are only two types of macroblocks, namely, Y and CbCr. While in other embodiments, if other color models are adopted, there may be more types of macroblocks, for example, there will be red, green, and blue three macroblocks if RGB tricolor model is adopted.

In the present embodiment, the external memory is SDRAM. The SDRAM may be replaced with other types of RAMs which require additional clock cycles for row changes.

Besides video decoding, the present invention may also be applied to any method or apparatus which accesses a memory in blocks. If the present invention is applied in other fields, the macroblocks in the present embodiment may be extended to any data blocks, and the video frames may be extended to any data array groups, wherein each data array group includes a plurality of data arrays and each data array is composed of data blocks of the same type.

In overview, the preset invention has at least following advantages:

1. the memory address mapping method in the present invention can be easily implemented and can convert word addresses quickly.

2. the present invention can be applied to data arrays of any sizes.

3. the present invention can be applied to various memory structures.

4. accesses to a memory can be coordinated between an operation apparatus and a read/write apparatus, wherein the operation apparatus may be a video decoder and the read/write apparatus may be a display controller.

5. memory access in the same data block by the foregoing operation apparatus does not require row change and memory access between different data blocks may not require row change, so that the efficiency of the memory can be improved.

6. no row change is required at every time the read apparatus reads data from the memory so that the efficiency of the memory can be improved.

7. if the foregoing operation apparatus is a video decoder, the present invention is suitable for various encoding standards, such as MPEG 1/2/4, H.264, VC-1 etc.

8. the present invention can be applied to various digital multimedia fields such as digital TV and digital versatile disc (DVD) player etc.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A memory accessing apparatus, comprising:
   a read buffer;
   a write buffer;
   a first address generator; and
   a calculation unit, wherein
   the read buffer reads a plurality of first datasets from at least one memory according to a plurality of read addresses provided by the first address generator, and the read buffer provides the first datasets to the calculation unit,
   the calculation unit receiving a data signal and generating a plurality of second datasets according to the data signal and the first datasets if the calculation unit determining the first datasets are required, otherwise generating the second datasets according to the data signal,
   the write buffer receiving the second datasets from the calculation unit and writing the second datasets into the memory according to a plurality of write addresses provided by the first address generator,
   each of the first datasets comprises various types of first data blocks, the read buffer reading the first datasets from the memory by the types of the first data blocks type by type, the read buffer providing the first datasets to the calculation unit dataset by dataset which contains the first data blocks,
   each of the second datasets comprises various types of second data blocks, the write buffer receiving the second datasets from the calculation unit dataset by dataset, the second dataset contains the second data blocks, the write buffer writing the second datasets to the memory by the types of the second data blocks type by type,
   each of the first data blocks and the second data blocks, belongs to a data array, the data array belongs to a data array group, each of the data array group comprises the same type of data blocks, each of the data arrays comprises a plurality of data clusters, each of the data clusters comprises a plurality of the data blocks, each of the data clusters is stored in the same row of the memory, the read address and write address of each of the data blocks are determined according to the position of the data block in the data cluster and the position of the data cluster in the data array,
   wherein the types of the first data blocks and the types of the second data blocks comprise Y macroblock and CbCr macroblock.

2. The memory accessing apparatus as claimed in claim 1, wherein the calculation unit is a video decoder, the data signal is a video data compressed by a video encoder, each of the first data blocks comprises a macroblock and a plurality of pixel data adjacent to the macroblock, each of the second data blocks is a macroblock, the data array groups are video frames, each type of the data blocks comprises at least one pixel component of the video frames.

3. The memory accessing apparatus as claimed in claim 2 further comprising:
   a residual buffer, storing a plurality of residual data decoded from the data signal by the calculation unit, providing the residual data to the calculation unit to generate the second datasets; and
   a read/write control unit, controlling the read buffer to read the first datasets required for decoding from the memory according to types of the frame being decoded by the calculation unit, and controlling the write buffer to write the decoded second datasets into the memory, the type of the frame is I frame, P frame, or B frame.

4. The memory accessing apparatus as claimed in claim 2, wherein the data blocks are read or written in words, the number of bits in each of the words is determined according to the total width of the data bus of the memory, and
   the width of the data cluster to which the word belongs is $2^a$ words, the height of the data cluster is $2^b$ pixels, the width of the frame to which the data cluster belongs is considered as $2^c$ data clusters, the width of the frame is also considered as $2^p$ pixels; the logic address of the word in the frame is divided into a first section, a second section, a third section, and a fourth section from the least significant bit (LSB) to the most significant bit (MSB), wherein the first section comprises a bits, the second section comprises c bits, the third section comprises b bits; the storage address of the word in the memory comprises a column address and a row address; the column address is sequentially divided into a low section and a high section from the LSB to the MSB, wherein the low section is identical to the first section of the logic address, the high section is identical to the third section of the logic address; the row address is sequentially divided into a low section and a high section from the LSB to the MSB, wherein the low section is identical to the second section of the logic address, the high section is identical to the fourth section of the logic address; a, b, c, and p are all predetermined positive integers.

5. The memory accessing apparatus as claimed in claim 2, wherein the video encoder encodes with a YCbCr color model.

6. The memory accessing apparatus as claimed in claim 1, wherein the read buffer comprises:
   a data buffer, storing the first data blocks read from the memory;
   an address buffer, receiving the read addresses of the first data blocks from the first address generator and storing the read addresses; and
   an output control unit, determining the order in which the data buffer providing the first data blocks to the calculation unit according to types of the video frame being decoded by the calculation unit, said type of the frame is I frame, P frame, or B frame.

7. The memory accessing apparatus as claimed in claim 1, wherein the write buffer comprises:
   a data buffer, storing a plurality of the second data blocks received from the calculation unit;
   an address buffer, receiving the write addresses of the second data blocks stored in the data buffer from the first address generator and storing the write addresses; and
   an output control unit, controlling the transmission path of the second data blocks in the write buffer; when the write buffer receives the second data blocks of a predetermined type, the output control unit controlling the second data blocks of the predetermined type to be written into the memory directly; when the write buffer receives the second data blocks of other types, the output control unit controlling the second data blocks of other types to be stored into the data buffer and written into the memory after the second data blocks of the predetermined type are written into the memory.

8. The memory accessing apparatus as claimed in claim 1 further comprising:
    a memory read unit, reading the data of the data array groups from the memory in a predetermined order; and
    an arbiter, coordinating the accesses of the calculation unit and the memory read unit to the memory, allowing the calculation unit to take precedence.

9. The memory accessing apparatus as claimed in claim 8, wherein the memory read unit reads a predetermined quantity of data from the memory, and the predetermined quantity is appointed by the arbiter and is less than or equal to the width of each of the data clusters.

10. The memory accessing apparatus as claimed in claim 8, wherein the memory read unit comprises a second address generator for generating read addresses required by the memory read unit.

11. The memory accessing apparatus as claimed in claim 8, wherein the memory read unit is a display controller which reads data from the memory to be displayed by a display as video frames.

12. The memory accessing apparatus as claimed in claim 8, further comprising a read/write control unit for disabling the read buffer and the write buffer when the arbiter prevents the calculation unit from accessing the memory.

13. A memory accessing method, comprising:
    receiving a data signal, executing a predetermined calculation according to the data signal to generate a plurality of second datasets; and
    writing the second datasets into at least one memory, wherein
    each of the second datasets comprises various types of second data blocks, the predetermined calculation generates the second data blocks in the order of the datasets containing the second data blocks, and the second data blocks are written into the memory in the order of the types of the second data blocks,
    reading a plurality of first datasets from the memory, wherein
    each of the first datasets comprises various types of first data blocks, the first data blocks are read from the memory in the order of the types of the first data blocks, the predetermined calculation receives the first data blocks in the order of the datasets containing the first data blocks,
    wherein the types of the first data blocks and the types of the second data blocks comprise Y macroblock and CbCr macroblock.

14. The memory accessing method as claimed in claim 13, further comprising:
    wherein
    the second datasets are generated according to the data signal and the first datasets,
    each of the data blocks, namely, each of the first data blocks and the second data blocks, belongs to a data array, the data array belongs to a data array group, each of a plurality of data arrays in the data array group comprises data blocks of the same type, each of the data arrays comprises a plurality of data clusters, each of the data clusters comprises a plurality of the data blocks, each of the data clusters is stored in the same row of the memory, the read address and write address of each of the data blocks are determined according to the position of the data block in the data cluster and the position of the data cluster in the data array.

15. The memory accessing method as claimed in claim 14, wherein the predetermined calculation is a video decoding calculation, the data signal is a video data compressed by a video encoding calculation, each of the first data blocks comprises a macroblock and a plurality of pixel data adjacent to the macroblock, each of the second data blocks is a macroblock, the data array groups are video frames, each type of the data blocks comprises at least one pixel component of the video frames.

16. The memory accessing method as claimed in claim 15, further comprising:
    storing a plurality of residual data decoded from the data signal by the predetermined calculation, then providing the residual data to the predetermined calculation to generate the second datasets;
    reading the first datasets required for decoding from the memory according to the type of the frame being decoded by the predetermined calculation; and
    writing the decoded second datasets into the memory according to the types of the frame being decoded by the predetermined calculation, the type of the frame is I frame, P frame, or B frame.

17. The memory accessing method as claimed in claim 15, wherein the data blocks are read and written in words, and the number of bits in each of the words is determined according to the total width of the data bus of the memory, and
    as to each of the words, the width of the data cluster to which the word belongs is $2^a$ words, the height of the data cluster is $2^b$ pixels, the width of the frame to which the data cluster belongs is considered as $2^c$ data clusters, the width of the frame is also considered as $2^p$ pixels; the logic address of the word in the frame is sequentially divided into a first section, a second section, a third section, and a fourth section from the LSB to the MSB, wherein the first section comprises a bits, the second section comprises c bits, the third section comprises b bits; the storage address of the word in the memory comprises a column address and a row address; the column address is sequentially divided into a low section and a high section from the LSB to the MSB, wherein the low section is identical to the first section of the logic address, the high section is identical to the third section of the logic address; the row address is sequentially divided into a low section and a high section from the LSB to the MSB, wherein the low section is identical to the second section of the logic address, the high section is identical to the fourth section of the logic address; a, b, c, and p are all predetermined positive integers.

18. The memory accessing method as claimed in claim 15, wherein the video encoding calculation encodes with a YCbCr color model.

19. The memory accessing method as claimed in claim 14, further comprising:
    determining the order in which the first data blocks are provided to the predetermined calculation according to the type of the video frame being decoded by the predetermined calculation.

20. The memory accessing method as claimed in claim 14, further comprising:
    when the predetermined calculation generates the second data blocks of a predetermined type, writing the second data blocks of the predetermined type directly into the memory; and
    when the predetermined calculation generates the second data blocks of other types, storing the second data blocks of other types and writing the second data blocks of other types into the memory after the second data blocks of the predetermined type are written into the memory.

21. A method for mapping memory addresses, the method comprising:

if the width of a data array is less than $2^p$ bytes, the width of the data array being considered as $2^p$ bytes in following steps, wherein p is the least integer which allows $2^p$ to be greater than or equal to the width of the data;

dividing the data array into a plurality of data clusters, then dividing each of the data clusters into a plurality of words, wherein the length of each of the words is $2^n$ bits, the width of each of the data clusters is $2^a$ words, the height of each of the data clusters is $2^b$ rows, the width of the data array is considered as $2^c$ data clusters, a, b, c, and n are all predetermined positive integers;

determining the column address and row address of each of the words in a memory according to the position of the word in the data cluster and the position of the data cluster in the data array, wherein all the words in each of the data clusters have the same row address;

sequentially dividing the logic address of the word in the data array into a first section, a second section, a third section, and a fourth section from the LSB to the MSB, wherein the first section comprises a bits, the second section comprises c bits, and the third section comprises b bits;

forming the column address of the word with the first section and the third section of the logic address; and forming the row address of the word with the second section and the fourth section of the logic address.

22. The memory address mapping method as claimed in claim 21, wherein the first section of the logic address comprises the LSB of the column address, the third section of the logic address comprises the MSB of the column address; the second section of the logic address comprises the LSB of the row address, the fourth section of the logic address comprises the MSB of the row address.

* * * * *